(12) United States Patent
Ban et al.

(10) Patent No.: US 12,126,579 B2
(45) Date of Patent: Oct. 22, 2024

(54) METHOD AND APPARATUS FOR MESSAGING SERVICE

(71) Applicant: KAKAO CORP., Jeju-si (KR)

(72) Inventors: Dong Hyun Ban, Seongnam-si (KR); Han Wool Cha, Seongnam-si (KR); Dong Hee Hong, Seongnam-si (KR); Hui Su Kim, Seongnam-si (KR); Na Young Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/316,231

(22) Filed: May 12, 2023

(65) Prior Publication Data

US 2023/0370396 A1 Nov. 16, 2023

(30) Foreign Application Priority Data

May 13, 2022 (KR) ........................ 10-2022-0059034

(51) Int. Cl.
*G06F 15/16* (2006.01)
*H04L 51/04* (2022.01)

(52) U.S. Cl.
CPC .................................... *H04L 51/04* (2013.01)

(58) Field of Classification Search
CPC ....... H04L 51/04; H04L 51/063; H04L 51/21; H04L 51/00
USPC ......................................... 709/206, 204, 203
See application file for complete search history.

(56) References Cited

U.S. PATENT DOCUMENTS

| | | | | |
|---|---|---|---|---|
| 7,146,381 B1 * | 12/2006 | Allen | .................... | G06F 40/205 706/14 |
| 2007/0050187 A1 * | 3/2007 | Cox | ....................... | G06Q 10/10 704/9 |
| 2007/0299872 A1 * | 12/2007 | Bier | ........................ | G06F 16/34 707/E17.093 |
| 2010/0262599 A1 * | 10/2010 | Nitz | ....................... | G06F 16/248 707/723 |
| 2010/0332481 A1 * | 12/2010 | Rowney | ................ | G06F 21/606 715/764 |
| 2012/0198005 A1 * | 8/2012 | DeLuca | ............... | G06Q 10/107 709/206 |
| 2015/0161246 A1 * | 6/2015 | Liu | ........................ | G06F 3/0237 707/722 |

(Continued)

FOREIGN PATENT DOCUMENTS

| | | |
|---|---|---|
| JP | 2009070180 A | 4/2009 |
| KR | 20080078431 A | 8/2008 |
| KR | 20180050636 A | 5/2018 |

OTHER PUBLICATIONS

International Search Report; International Application No. KR10-2022-0059034; International Filing Date: May 13, 2022; Date of mailing: Apr. 1, 2024; 5 pages. (Machine Translation).

*Primary Examiner* — Kaylee J Huang
(74) *Attorney, Agent, or Firm* — CANTOR COLBURN LLP

(57) ABSTRACT

A method and an apparatus for a messaging service are disclosed. A method of operating a terminal on which an application for a messaging service is installed includes detecting a keyword from a text input through a message input window, cumulatively displaying the detected keyword on a suggest area, setting information about a link to a selected keyword in the text, and separately displaying the selected keyword from a non-selected keyword on the suggest area.

20 Claims, 24 Drawing Sheets

(56) References Cited

U.S. PATENT DOCUMENTS

| | | | |
|---|---|---|---|
| 2016/0092405 A1* | 3/2016 | Lee | G06F 9/451 |
| | | | 715/202 |
| 2018/0218085 A1* | 8/2018 | Price | G06F 40/134 |
| 2021/0342338 A1* | 11/2021 | Nocedal De La Garza | ............... |
| | | | G06F 3/0488 |
| 2023/0179560 A1* | 6/2023 | Zhang | H04L 51/42 |
| | | | 709/206 |

* cited by examiner

| Message input window | Target to be checked | Keyword |
|---|---|---|
| 201 — Gangnam Station| | Gangnam Station | Gangnam Station |
| 202 — Gangnam Station or Seoul Nat'l Univ. of Education Station| | Gangnam Station, Gangnam Station o, Gangnam Station or, Gangnam Station or Seoul Univ., Gangnam Station or Seoul Nat'l Univ. of Education Station, nam Station o, ..., r Seoul Nat'l Univ. of Education Station, Seoul Nat'l Univ. of Education Station | Gangnam Station Seoul Nat'l Univ. of Education Station |

FIG. 2A

| Message input window | Target to be checked | Keyword |
|---|---|---|
| 203 — On the weekend| | On the weekend | – |
| 204 — Gangnam Station or Seoul Nat'l Univ. of Education Station on the weekend| | Gangnam Station, Gangnam Station o, Gangnam Station or, Gangnam Station or Seoul Univ., Gangnam Station or Seoul Nat'l Univ. of Education Station, nam Station o, ..., r Seoul Nat'l Univ. of Education Station, Seoul Nat'l Univ. of Education Station | Gangnam Station Seoul Nat'l Univ. of Education Station |

FIG. 2B

METHOD AND APPARATUS FOR MESSAGING SERVICE

CROSS-REFERENCE TO RELATED APPLICATIONS

This application claims the benefit of Korean Patent Application No. 10-2022-0059034 filed on May 13, 2022, in the Korean Intellectual Property Office, the entire disclosure of which is incorporated herein by reference for all purposes.

BACKGROUND

1. Field of the Invention

One or more embodiments relate to a method and apparatus for a messaging service, and specifically, to a terminal on which an application for a messaging service is installed and a method of operating the terminal.

2. Description of the Related Art

Recently, with the development of mobile smart devices, use of an online platform service to communicate with other users via network has increased. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

The increase in communication via mobile devices has further allowed the online platform services to support functions for sharing various types of data and assisting communication in addition to a function for users to have one-on-one communication with other users by text.

SUMMARY

Embodiments provide chat interface technology for improving user convenience by combining a chat function in a mobile environment through the following embodiments.

Embodiments provide technology for easily accessing and sharing a search result screen of a web browser during a chat by setting a link to the search result screen in a message through the following embodiments.

However, the technical aspects are not limited to the aforementioned aspects, and other technical aspects may be present.

According to an aspect, there is provided a method of operating a terminal on which an application for a messaging service is installed including detecting a keyword from a text input through a message input window in a chat interface, cumulatively displaying the detected keyword on a suggest area in the chat interface, setting information about a link to a selected keyword in the text in response to a keyword selection input received through the suggest area, and separately displaying the selected keyword from a non-selected keyword on the suggest area.

The method may further include separately displaying a keyword for which the information about the link is set from other words in the input text to the message input window in response to the keyword selection input received through the suggest area.

The method may further include sending a message including the information about the link and the text in response to a message transmission request received from a user of the terminal and separately displaying a word corresponding to the selected keyword in the message from other words in the message.

The method may further include determining the information about the link and the text as a transfer target when a first type of transfer request for the sent message is received and determining the text as a transfer target when a second type of transfer request for the sent message is received.

The method may further include detecting a message input of a user through the message input window and activating a display of the suggest area based on a detection of the message input and the detected keyword.

The method may further include storing the detected keyword and a position of the detected keyword in the text.

The detecting of the keyword may include detecting at least one keyword in at least a part of the text based on a position of a cursor in the message input window.

The detecting of the keyword may include detecting the keyword based on a spacing unit of the text.

The cumulatively displaying of the detected keyword may include cumulatively displaying the detected keyword based on whether the detected keyword overlaps with a pre-stored keyword corresponding the text.

The suggest area may be displayed adjacent to the message input window.

According to an aspect, there is provided a terminal on which an application for a messaging service is installed including at least one processor configured to detect a keyword in a text input through a message input window in a chat interface, cumulatively display the detected keyword on a suggest area in the chat interface, set information about a link to a selected keyword in the text in response to a keyword selection input received through the suggest area, and separately display the selected keyword from a non-selected keyword on the suggest area.

The at least one processor may be configured to separately display a keyword for which the information about the link is set from other words in the text input through the message input window in response to the keyword selection input received through the suggest area.

The at least one processor may be configured to send a message including the information about the link and the text in response to a message transmission request received from a user of the terminal and separately display a word corresponding to the selected keyword in the message from other words in the message.

The at least one processor may be configured to determine the information about the link and the text as a transfer target when a first type of transfer request for the sent message is received and determine the text as a transfer target when a second type of transfer request for the sent message is received.

The at least one processor may be configured to detect a message input of a user through the message input window and activate a display of the suggest area based on a detection of the message input and the detected keyword.

The at least one processor may be configured to store the detected keyword and a position of the detected keyword in the text.

The at least one processor may be configured to detect at least one keyword in at least a part of the text based on a position of a cursor in the message input window in the detecting of the keyword.

The at least one processor may be configured to detect the keyword based on a spacing unit of the text in the detecting of the keyword.

The at least one processor may be configured to cumulatively display the detected keyword based on whether the detected keyword overlaps with a pre-stored keyword corresponding to the text in the cumulating displaying of the detected keyword.

Additional aspects of embodiments will be set forth in part in the description which follows and, in part, will be apparent from the description, or may be learned by practice of the disclosure.

According to embodiments, it is possible to easily access a search result screen of a web browser through a sent and received message without separately calling the web browser for search during a chat.

According to embodiments, the present disclosure provides a function that may easily link and share a search result screen through a chat room by providing a chat interface that may automatically detect a keyword in an input text and link the keyword to the search result screen through a separate area.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 2A and 2B are diagrams illustrating an operation of detecting a keyword according to an embodiment;

DETAILED DESCRIPTION

Figure 1:
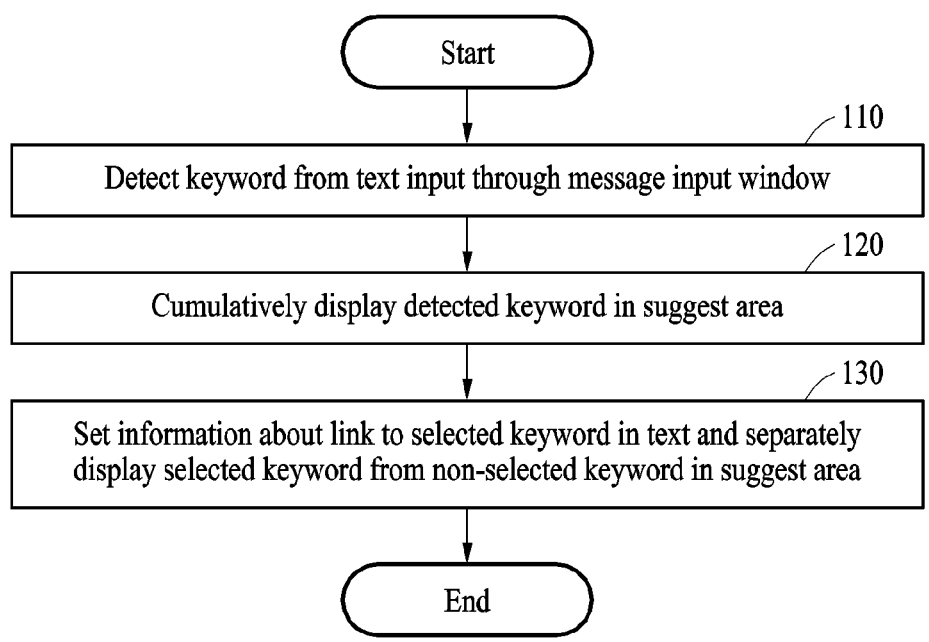
FIG. 1 is a flowchart illustrating a method of operating a terminal, according to an embodiment.

The following detailed structural or functional description is provided as an example only and various alterations and modifications may be made to examples. Here, examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the examples will be described in detail with reference to the accompanying drawings. When describing the embodiments with reference to the accompanying drawings, like reference numerals refer to like components and a repeated description related thereto will be omitted.

FIG. 1 is a flowchart illustrating a method of operating a terminal, according to an embodiment.

Referring to FIG. 1, a method of operating a terminal on which an application for a messaging service is installed according to an embodiment may include operation 110 of detecting a keyword from a text input through a message input window, operation 120 of cumulatively displaying the detected keyword on a suggest area, and operation 130 of setting information about a link to a selected keyword in the text and separately displaying the selected keyword from a non-selected keyword on the suggest area.

A terminal may be an electronic device, for example, one of a computer, a portable computer, a wireless phone, a mobile phone, a smartphone, a personal digital assistant (PDA), a web tablet, a wearable device, and the like, and may refer to any devices for installing and executing an application. Here, the terminal may receive services and/or content provided by a server under control of an application.

For example, under the control of the application, the terminal may perform all service operations such as service screen setting, data input, data transmission and reception, and data storage. For example, the terminal may process a user interface or user interaction through a processor and may output a processing result through an output device of the terminal or send the result to the server.

According to an embodiment, an application installed on a terminal may include a messenger application. Under the control of the messenger application, the terminal may receive a messaging service provided by a messaging server or a server.

According to an embodiment, the server may provide a messaging service that receives and sends messages between users subscribing to the service or sends a notification message to subscribed users. For example, the messaging service may include an instant messaging service (IMS) based on an instant message sent and received through a messenger application installed on a terminal of the subscribed users.

According to an embodiment, the server may create a user account regarding the messaging service in response to a messaging service subscription request of a user. The user account may be a unit for identifying, by a server, a user subscribing to a service. The terminal logged in to the user account may use services provided by the server. Hereinafter, the terminal may refer to a terminal logged in to the user account created through service subscription.

According to an embodiment, the messaging service may be provided to a terminal through a chat interface. The chat interface is an interface for a function of sending and receiving messages provided by the messaging service, and may include, for example, an interface that provides a function of sending messages through a chat room in which at least one user account participates and displaying received messages. The chat interface may correspond to a chat room, which is virtual space in which at least one user account participates and participants chat with each other.

For example, the chat interface may include an interfacing object that supports a function of sending and receiving messages through a chat room. The interfacing object is an object implemented to perform a certain function through interaction with users, and may include, for example, a button, an input field, a switch, and the like. For example, the chat interface may include a chat window displaying messages sent and received through a chat room, a message input window in which a text to be sent is input as a message, a virtual keyboard area to input a text, and/or an interfacing object that supports a function regarding the messaging service such as buttons to request a certain function or a service. According to an embodiment, the chat interface may include a suggest area in which a keyword for a link setting is displayed. The suggest area is described in detail below.

According to an embodiment, operation 110 may include detecting a keyword from a text input through a message input window in a chat interface.

According to an embodiment, a keyword is a word that may be used as a search term, may include, for example, subway station names (e.g., Gangnam Station, Seoul Nat'l Univ. of Education Station, Sinsa Station, etc.), place names (e.g., a restaurant, b movie theater, cc mall, etc.), place category names (e.g., an eatery, a restaurant, a cafe, a movie theater, a park, etc.), and celebrity names. For example, at least one word may be designated as a keyword in advance. For example, a word determined to have a high probability of being searched in a process of exchanging messages for conversation between users and/or a search term in which a search result is frequently shared in the process of exchanging messages may be designated as a keyword.

According to an embodiment, a set of word(s) (hereinafter, referred to as a "keyword set") designated as a keyword may be stored in a terminal. For example, the terminal may update the keyword set stored in the terminal based on a keyword set registered in a server. For example, the terminal may update the keyword set stored in the terminal based on the keyword set registered in the server, when an update of the keyword set registered in the server is detected or at regular intervals. The terminal may acquire, from the server, a keyword that is not stored in the terminal among keywords registered in the server and add the keyword to the keyword set. Alternatively, the keyword set stored in the terminal may be replaced with the keyword set registered in the server. According to an embodiment, the terminal may use a keyword set stored in a keyword database accessible from the server without separately storing the keyword set.

According to an embodiment, the terminal may detect a keyword from an input text based on the keyword set. For example, the terminal may detect a keyword from the input text by determining whether a word in a text input through a message input window is a word in the keyword set. For example, when the keyword set includes words such as "Seoul Nat'l Univ. of Education Station" and "Gangnam Station" as keywords, which are subway station names, "Gangnam Station", which is a word in the keyword set, may be detected as a keyword in the input text "Later at Gangnam Station".

According to an embodiment, the terminal may set word(s) detectable in at least a part of an input text as a target to be checked in terms of whether the word(s) corresponds to a keyword. The terminal may determine whether a word set as a target to be checked is a word designated as a keyword. For example, the terminal may determine whether the word set as the target to be checked is a word in the keyword set. When the word set as the target to be checked is a word designated as the keyword, the terminal may detect the corresponding target to be checked as a keyword.

According to an embodiment, the terminal may check whether a word greater than or equal to a predetermined threshold length is a keyword. That is, word(s) greater than or equal to the threshold length among word(s) detectable in at least a part of an input text may be set as a target to be checked in terms of whether the word(s) corresponds to a keyword.

According to an embodiment, operation 110 may include detecting at least one keyword from at least a part of an input text based on the position of the cursor (or a character cursor) in a message input window. For example, a terminal may check whether word(s) detectable in a text input before the position of the cursor in the message input window is a keyword. In another example, the terminal may check whether word(s) greater than or equal to a threshold length detectable in the text input before the position of the cursor in the message input window is a keyword. In another example, the terminal may check whether word(s) greater than or equal to the threshold length detectable in a word segment input immediately before the position of the cursor in the message input window is a keyword.

According to an embodiment, operation 110 may include detecting a keyword based on a spacing unit of an input text. The space unit is a text unit separated by a space character and may refer to a word segment. For example, a terminal may check whether word(s) detectable in a word segment input immediately before the position of the cursor in the message input window is a keyword.

According to an embodiment, a terminal may check whether a word (e.g., a word greater than or equal to 3 letters) including the number of letters greater than or equal to a threshold value in a text input before the position of the cursor is a keyword, based on the position of the cursor.

For example, referring to FIG. 2A, in a state 201 in which "Gangnam Station" is input to a message input window, a word to be checked may include "Gangnam Station". When "Gangnam Station" is a word in a keyword set, the keyword "Gangnam Station" may be detected from the input text.

In another example, in a state 202 in which "Gangnam Station or Seoul Nat'l Univ. of Education Station" is input to the message input window, a word to be checked may include "Gangnam Station", "Gangnam Station o", "Gangnam Station or", "Gangnam Station or Seoul Nat'l Univ. of", "Gangnam Station or Seoul Nat'l Univ. of Education", "Gangnam Station or Seoul Nat'l Univ. of Education Station", "nam Station o", "r Seoul Nat'l Univ. of Education Station", and "Seoul Nat'l Univ. of Education Station". When "Gangnam Station" and "Seoul Nat'l Univ. of Education Station" among words to be checked are words in the keyword set, the keyword "Gangnam Station" and the keyword "Seoul Nat'l Univ. of Education Station" may be detected from the input text.

For example, referring to FIG. 2B, a target to be checked may be determined in a word segment including the cursor, that is, a text from a character next to the most recently input space character or a first input character to a character immediately before the position of the cursor. For example, in a state 203 in which "on the weekend" is input to the message input window, a target to be checked may be determined in "on the weekend". Since a word greater than or equal to 3 letters detectable in "on the weekend" is only "on the weekend" a keyword may not be detected in the state 203.

In another example, in a state 204 in which "Gangnam Station or Seoul Nat'l Univ. of Education Station on the weekend" is input to the message input window, a word to be checked may be detected in "Gangnam Station or Seoul Nat'l Univ. of Education Station", which is a space unit. Since a keyword check of a word including "on the weekend" is performed in the state 203 in which only "on the weekend" is input, a keyword may be checked at "Gangnam Station or Seoul Nat'l Univ. of Education Station" after a space character is input. A word to be checked may include "Gangnam Station", "Gangnam Station o", "Gangnam Station or", "Gangnam Station or Seoul Nat'l Univ. of", "Gangnam Station or Seoul Nat'l Univ. of Education", "Gangnam Station or Seoul Nat'l Univ. of Education Station", "nam Station o", "r Seoul Nat'l Univ. of Education Station", and "Seoul Nat'l Univ. of Education Station". When "Gangnam Station" and "Seoul Nat'l Univ. of Education Station" among words to be checked are words in the keyword set, the keyword "Gangnam Station" and the keyword "Seoul Nat'l Univ. of Education Station" may be detected from the input text.

According to an embodiment, operation 120 may include detecting a keyword from a text input through a message input window in a chat interface. At least one keyword detected from the input text may be cumulatively displayed on a suggest area. The cumulatively displaying may refer to adding a display of a newly detected keyword on the suggest area in which a pre-detected keyword is displayed whenever a keyword is detected.

According to an embodiment, the suggest area may correspond to an interfacing object that may display a detected keyword in a chat interface and receive an input for a link setting. For example, the suggest area may be displayed adjacent to a message input window.

Figure 3A:
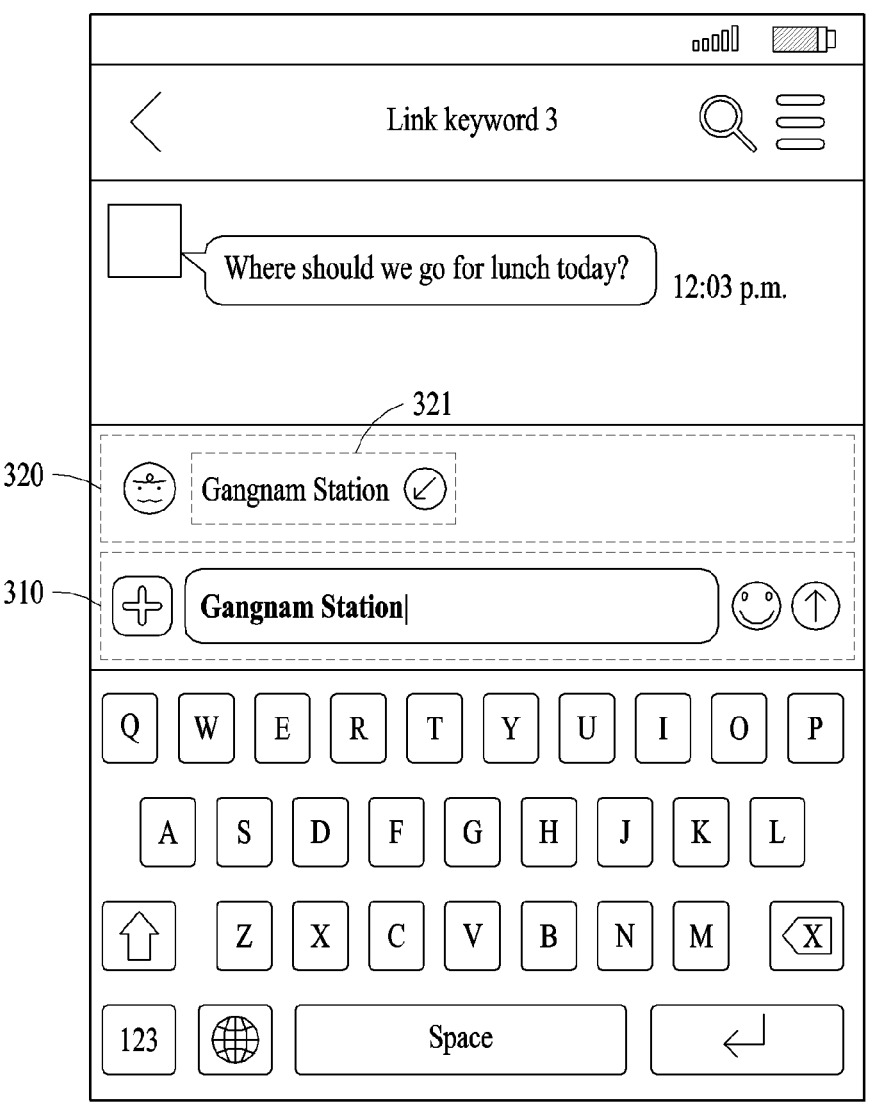
FIGS. 3A and 3B are diagrams illustrating an example of a chat interface including suggest areas according to an embodiment.
Figure 3B:
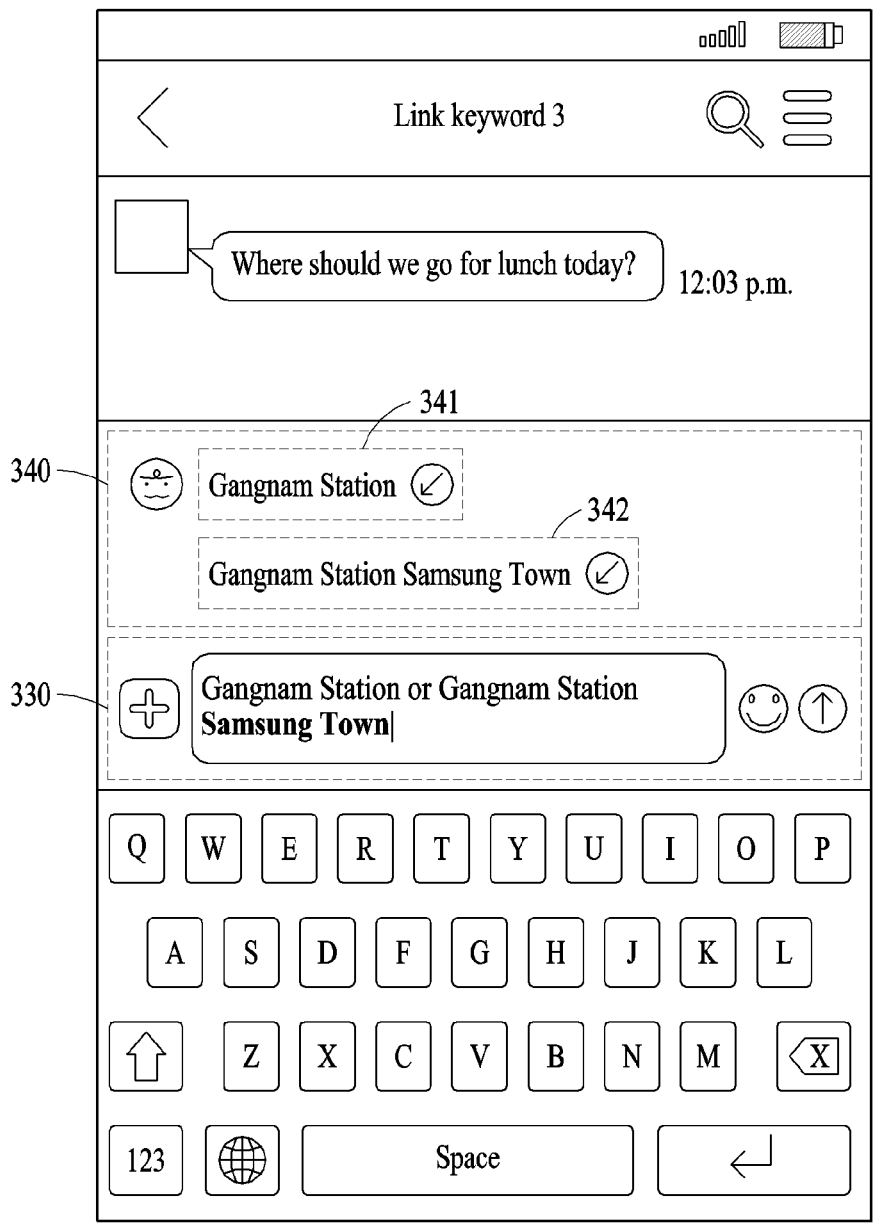

For example, FIGS. 3A and 3B are diagrams illustrating an example of a chat interface including suggest areas 320 and 340 respectively displayed adjacent to message input windows 310 and 330. A keyword detected from a text input through the message input windows 310 and 330 may be displayed on the suggest areas 320 and 340. Displays 321, 341, and 342 of keywords on the suggest areas 320 and 340 may be implemented as an interfacing object that may interact with users. For example, the displays 321, 341, and 342 of keywords may be implemented as an interfacing object that receives a selection input from users and sets information about a link in response to the selection input. According to an embodiment, a function of setting the information about the link is described in detail below.

A method of operating a terminal according to an embodiment may further include detecting a message input of a user through a message input window and activating a display of a suggest area based on a detection of the message input and a detected keyword. Displays of the suggest areas 320 and 340 may be activated when a message input is detected through the message input windows 310 and 330 and a keyword is detected in an input text.

When an input other than a message input is sensed, the displays of the suggest areas 320 and 340 may be deactivated. For example, when an input for selecting a side menu, an emoticon input, and/or a search term input is sensed, the displays of the suggest areas 320 and 340 may be deactivated. In this case, a pre-detected keyword may be stored, and when a message input is sensed again, the suggest areas 320 and 340 may be displayed again and the pre-detected keyword may be displayed on the suggest areas 320 and 340. When a message input is sensed but a detected keyword does not exist, the displays of the suggest areas 320 and 340 may not be activated.

According to an embodiment, when a plurality of keywords is detected in a text, the plurality of keywords may be cumulatively displayed on a suggest area. For example, referring to FIG. 3B, when the keyword "Gangnam Station Samsung Town" is additionally detected by an additional text input in a state in which the keyword "Gangnam Station" is first detected, the display 342 of the keyword of the newly detected "Gangnam Station Samsung Town" may be added on to the suggest area 340 in addition to the display 341 of the pre-detected keyword "Gangnam Station".

A method of operating a terminal according to an embodiment may further include storing a detected keyword and the position of a keyword in a text. That is, a terminal may store the detected keyword according to operation 110 and the position of the keyword in the text corresponding to an input text. The stored keyword and position information of the keyword in the text may be initialized when the input text is sent as a message. Hereinafter, the keyword(s) stored corresponding to the text and the position(s) of the keyword(s) in the text may be referred to as keyword information corresponding to the text.

According to an embodiment, operations 110 and 120 may be repeatedly performed whenever an input for changing a text is received through a message input window. For example, operations 110 and 120 may be repeatedly performed whenever an input for changing an input text is received, such as when a text is newly added through the message input window or a pre-written text is deleted. That is, as the text input through the message input window is modified, a keyword may be changed and a display of the keyword on a suggest area may be changed. As operations 110 and 120 are repeatedly performed, the keyword stored corresponding to the input text and the position information of the keyword in the text may be modified.

Figure 4A:
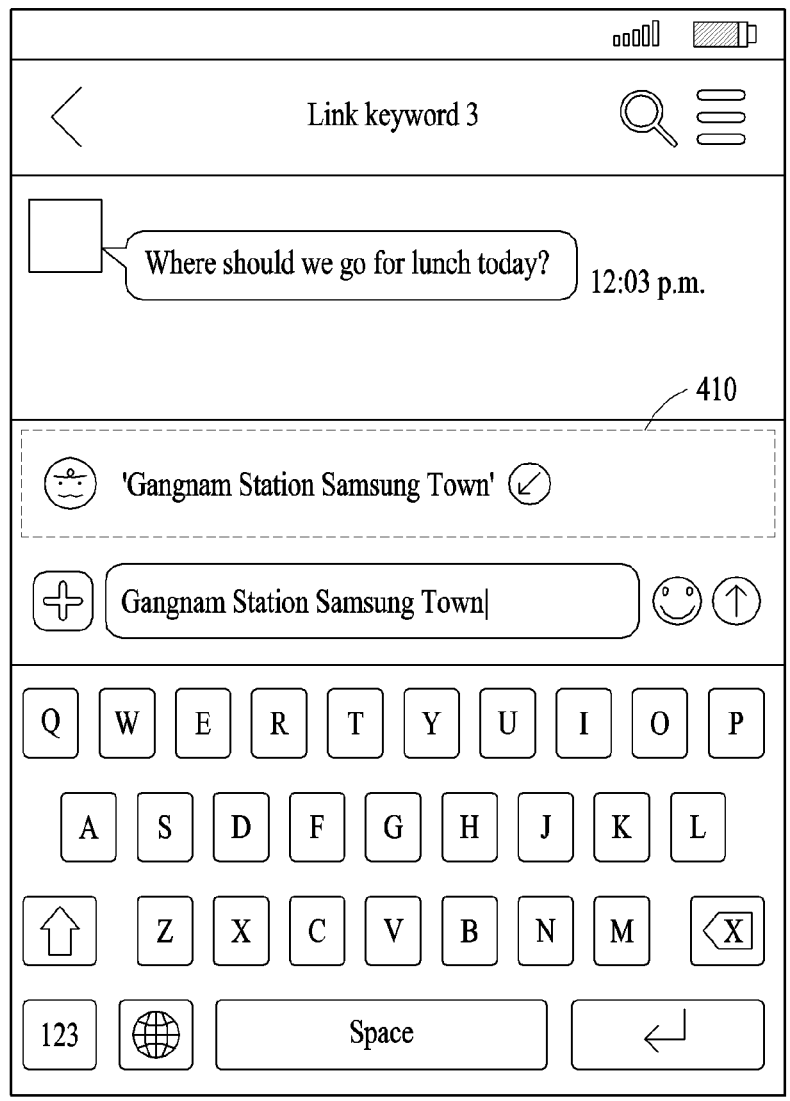
FIGS. 4A to 4C are diagrams illustrating an example in which a display of a keyword on a suggest area is changed by text correction according to an embodiment.

For example, referring to FIG. 3A, when "Gangnam Station" is input to the message input window 310, "Gangnam Station" may be detected as a keyword and the keyword "Gangnam Station" may be displayed on the suggest area 320. Corresponding to an input text, the keyword "Gangnam Station" and the position of "Gangnam Station" in the text may be stored. When a state is changed from a state, in which "Gangnam Station" is input to the message input window 310, as shown in FIG. 3A, to a state in which "Gangnam Station Samsung Town" is input by an additional text input, as shown in FIG. 4A, operation 110 of detecting a keyword of "Gangnam Station Samsung Town" may be performed. As a result, the detected keyword "Gangnam Station" may be modified to "Gangnam Station Samsung Town". As the detected keyword is modified, a keyword displayed on a suggest area 410 may be changed from "Gangnam Station" to 'Gangnam Station Samsung Town". In addition, keyword information stored corresponding to the text may include the keyword "Gangnam Station Samsung Town" and the position of "Gangnam Station Samsung Town" in the text.

Figure 4B:
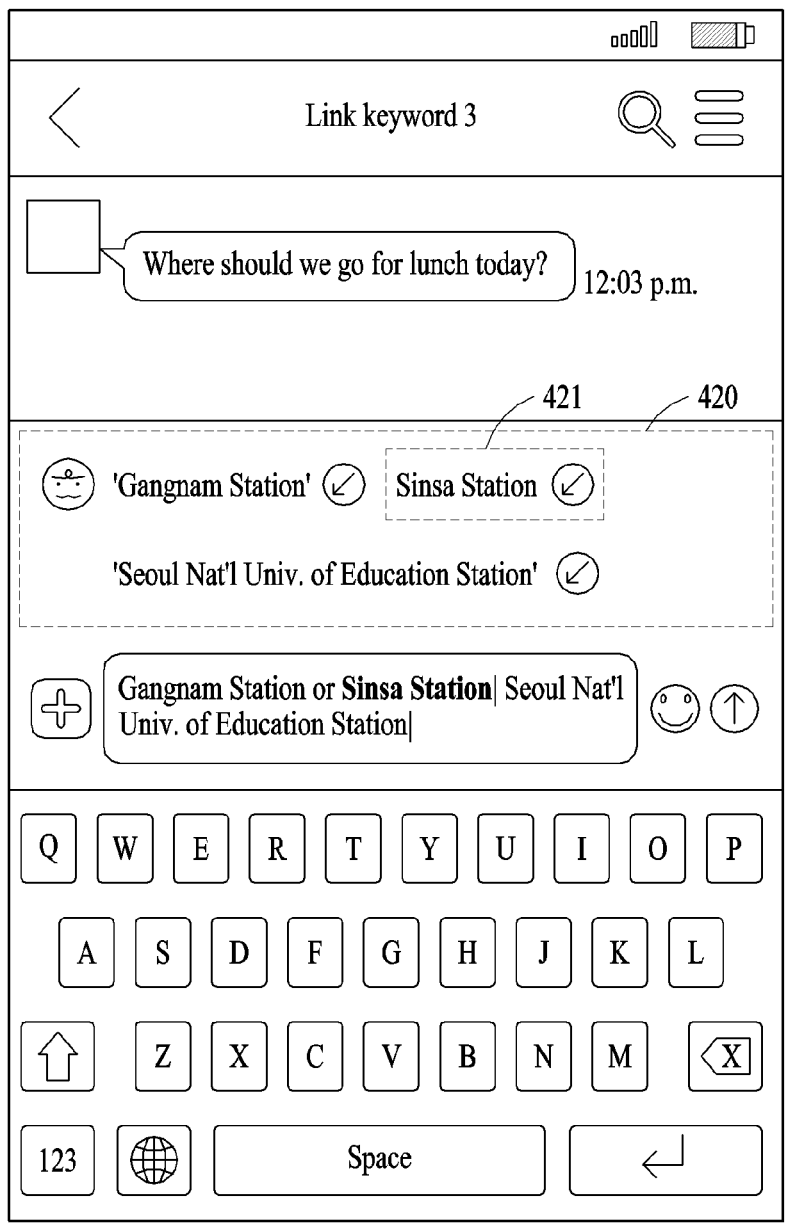

According to an embodiment, even when a new character is added in the middle of an input text, a detected keyword and a display of a keyword of a suggest area may be changed. For example, referring to FIG. 4B, when a text of "Sinsa Station" is added between "or" and "Seoul Nat'l Univ. of Education Station" in a state in which a text of "Gangnam Station or Seoul Nat'l Univ. of Education Station" is input, the keyword "Sinsa Station" based on the position of the cursor may be newly detected. As a keyword is newly detected, a display 421 of the newly detected keyword "Sinsa Station" may be added to a suggest area 420. The keywords may be displayed on the suggest area 420 in an order in which the keywords are in the text. In another example, unlike shown in FIG. 4B, a plurality of keywords may be displayed on the suggest area 420 in an order in which the plurality of keywords is detected. In this case, the display 421 of the most recently detected keyword "Sinsa Station" in FIG. 4B may be at the rightmost side of the suggest area 420.

Figure 4C:
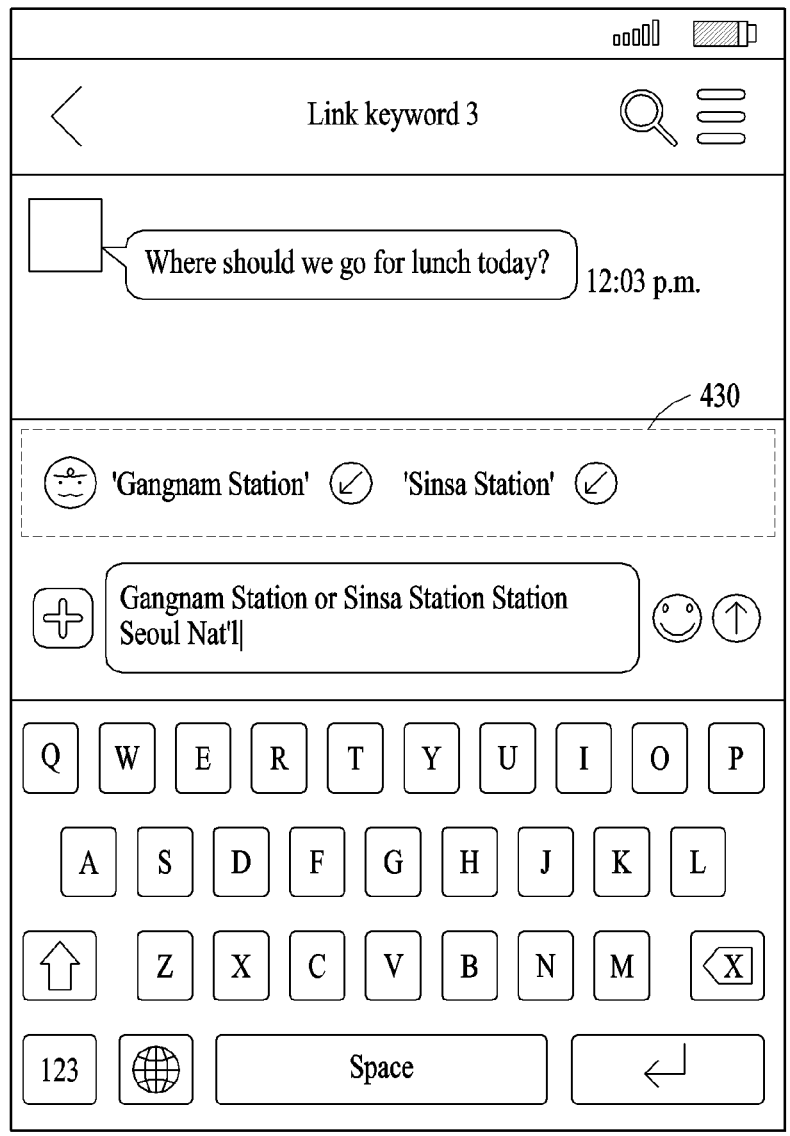

According to an embodiment, when an input text in a message input window is deleted, a detected keyword may be modified. For example, referring to FIG. 4C, since an input text no longer includes "Seoul Nat'l Univ. of Education Station" as "Univ. of Education Station" is deleted from the input text "Gangnam Station or Sinsa Station Seoul Nat'l Univ. of Education Station", the keyword "Seoul Nat'l Univ. of Education Station" among pre-detected keywords may be deleted. A display corresponding to the keyword "Seoul Nat'l Univ. of Education Station" on a suggest area 430 may also be deleted. The stored keyword information about "Seoul Nat'l Univ. of Education Station" may also be deleted.

According to an embodiment, operation 120 may include cumulatively displaying a detected keyword based on whether the detected keyword overlaps with a pre-stored keyword corresponding to a text. When the detected keyword overlaps with the pre-stored keyword corresponding to the text, the detected keyword may not be displayed on a suggest area. Through this, it is possible to prevent the same keyword from being displayed multiple times on the suggest area. According to an embodiment, when the detected keyword overlaps with the pre-stored keyword, keyword information about the detected keyword may not be stored.

According to an embodiment, as a keyword is cumulatively displayed on a suggest area, displays of keywords may exceed the width of the suggest area. The suggest area may be implemented in various ways to display all keywords. For example, the suggest area may be expanded based on an area occupied by keywords to be displayed. When the suggest area is expanded without limit, the suggest area may collide with other areas or other functions of a chat interface, and accordingly, the size of an area where the suggest area is displayed may be limited. The suggest area may be implemented in various ways to display the plurality of keywords in a limited area. For example, the suggest area may be implemented to be moved by a scroll or a swipe input, or keywords may be displayed to be divided into a plurality of pages by pagination.

According to an embodiment, operation 130 may include setting information about a link to a selected keyword in a text in response to a keyword selection input received through a suggest area and separately displaying the selected keyword from a non-selected keyword on the suggest area in response to the keyword selection input received through the suggest area.

According to an embodiment, an input for selecting a displayed keyword may be received from a user through a suggest area. For example, a touch input or a click input to an area in which a keyword is displayed on the suggest area may be recognized as an input for selecting the corresponding keyword. For example, the suggest area may include a button for selecting a keyword in the area in which the keyword is displayed so that the user selects the keyword displayed on the suggest area. Alternatively, the area in which the keyword is displayed on the suggest area may be implemented as a button that may receive a selection input.

Figure 5A:
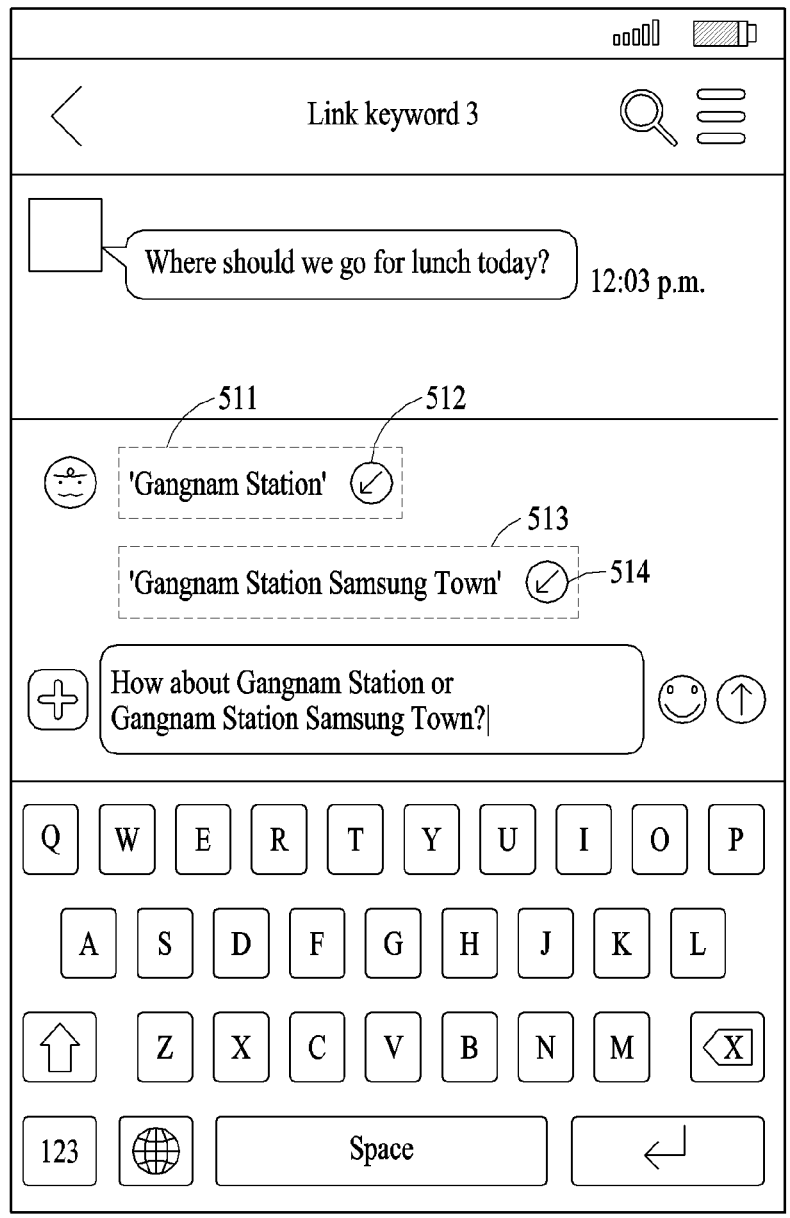
FIGS. 5A to 5C are diagrams illustrating an example of receiving a keyword selection input through a chat interface according to an embodiment.

For example, referring to FIG. 5A, a user may input a selection of areas 511 and 513 where a keyword is displayed or a selection of buttons 512 and 514 for selecting the keyword on a suggest area. When the selection input of the area 511 where the keyword is displayed or the selection input of the button 512 for selecting the keyword is received from the user, the terminal may recognize that the keyword "Gangnam Station" is selected. When the selection input of the area 513 where the keyword is displayed or the selection input of the button 514 for selecting the keyword is received from the user, the terminal may recognize that the keyword "Gangnam Station Samsung Town" is selected.

According to an embodiment, when a selection input of a certain keyword is sensed from a user, information about a link may be set to a word corresponding to a selected keyword in a text input to a message input window. For example, the setting of the information about the link to the word corresponding to the selected keyword may include setting a link to the corresponding word and/or adding information necessary for setting the link to the corresponding word. For example, a link set to a word corresponding to a keyword may include various types of links, such as a search link to a search result screen of a web browser using a keyword as a search term and an execution link of an application corresponding to the keyword.

Figure 5B:
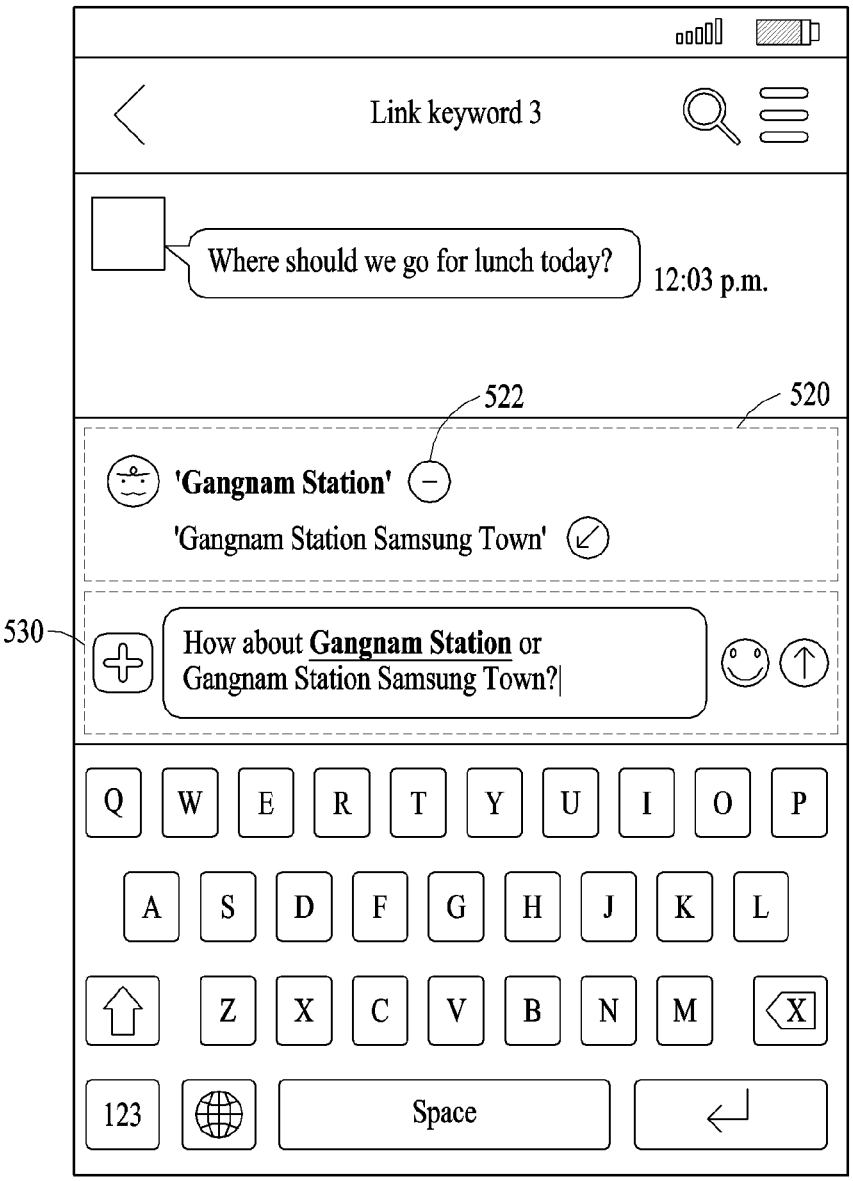

According to an embodiment, the terminal may separately display a selected keyword from a non-selected keyword on a suggest area. That is, a display of a keyword before and after being selected may be changed so that a user visually separates a keyword for which information about a link is set in a chat interface. For example, referring to FIG. 5B, when the keyword "Gangnam Station" is selected, the keyword "Gangnam Station" may be displayed in a different color from the keyword "Gangnam Station Samsung Town" on a suggest area 520 or a shape of a button 522 for selecting the keyword may change.

A method of operating a terminal according to an embodiment may further include separately displaying a keyword for which information about a link is set from other words in an input text in a message input window in response to a keyword selection input received through a suggest area. For example, referring to FIG. 5B, the keyword for which the information about the link may be separated from other words by underlining the keyword for which the information about the link is set and by not underlining the rest of the text in a message input window 530.

Figure 5C:
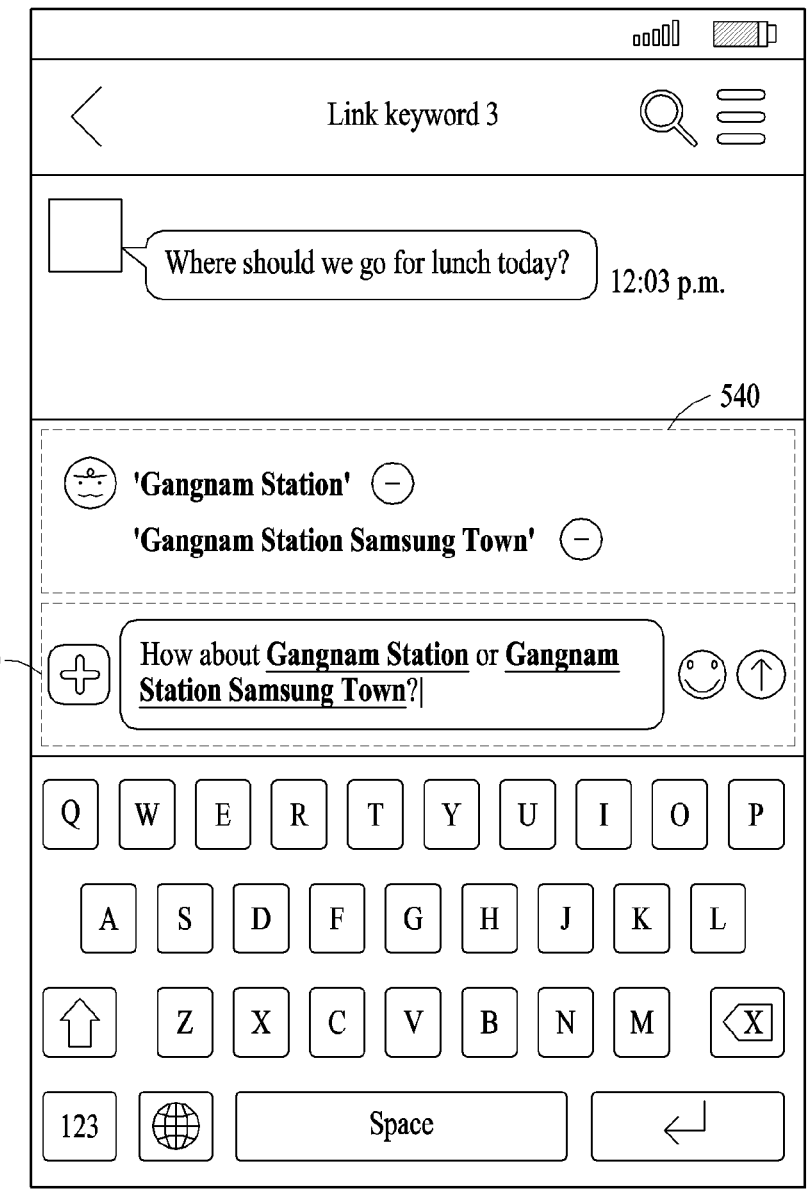

According to an embodiment, a plurality of keywords may be selected by a user and pieces of information about a link may be set for the plurality of selected keywords, respectively. For example, each of the plurality of selected keywords may be displayed, on a suggest area, to be separated from displays of other keywords that are not selected. For example, each of the plurality of selected keywords may be displayed to be separated from other words in a message input window. For example, referring to FIG. 5C, when the keyword "Gangnam Station" and the keyword of "Gangnam Station Samsung Town" are selected by a user, the keyword "Gangnam Station" and the keyword "Gangnam Station Samsung Town" may be changed displays to indicate that the keyword "Gangnam Station" and the keyword "Gangnam Station Samsung Town" are selected keywords on a suggest area 540. "Gangnam Station" and "Gangnam Station Samsung Town" corresponding to the keywords selected in a message input window 550 may be displayed to be separated from other words in the text.

Figure 6A:
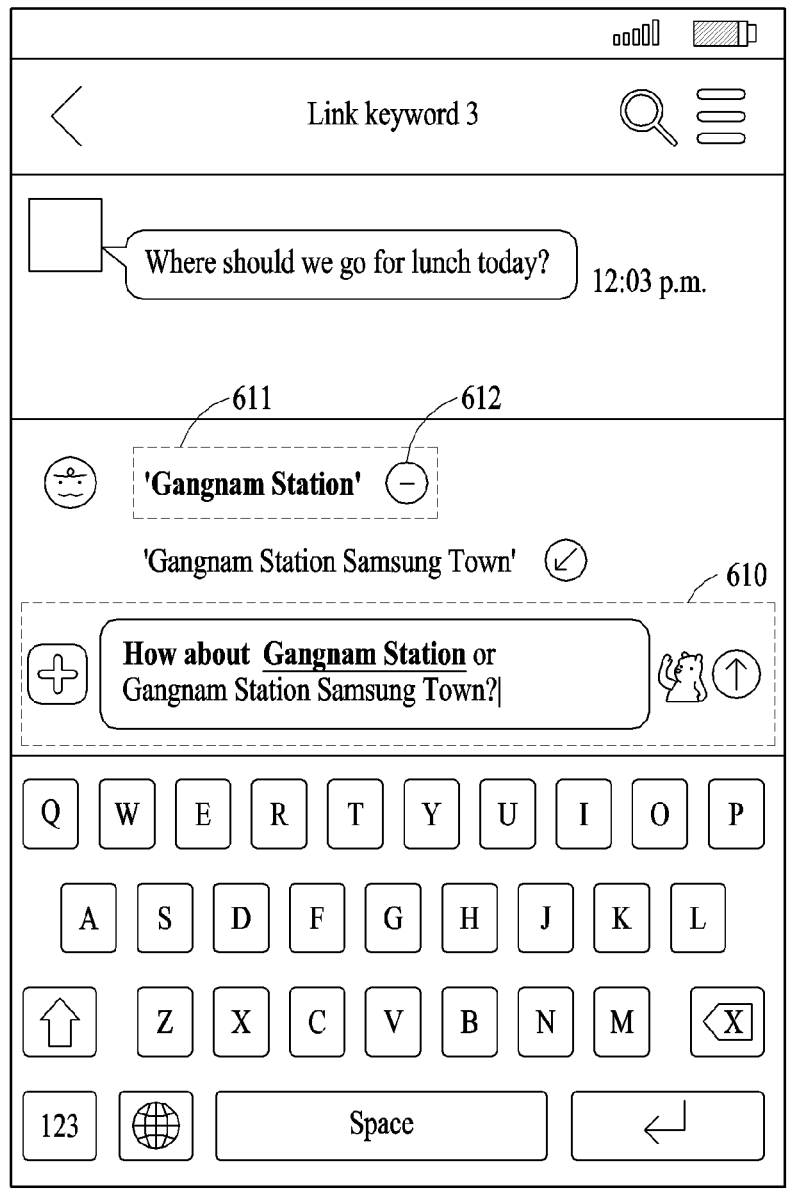
FIGS. 6A to 6C are diagrams illustrating an example in which a selection of a keyword is released through a chat interface according to an embodiment.
Figure 6B:
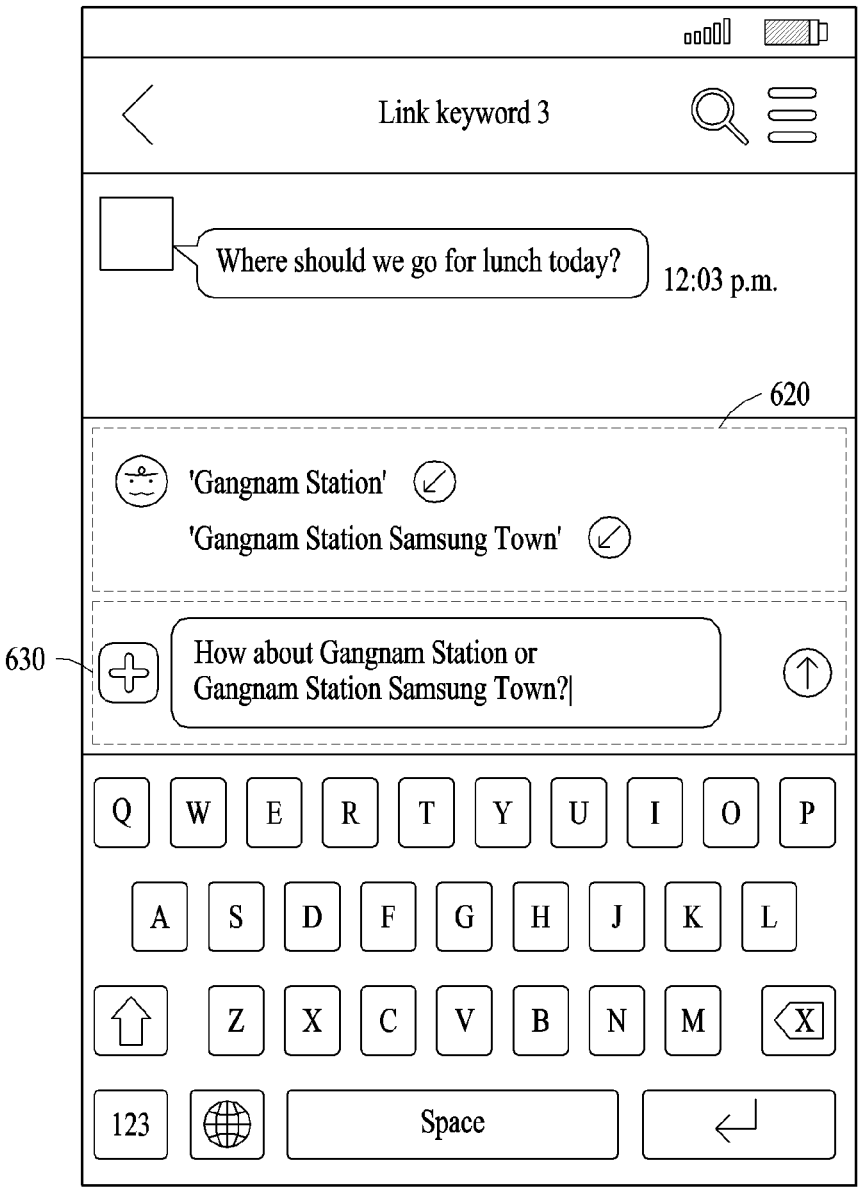

According to an embodiment, a selection for a keyword may be released and when the selection is released, the setting of information about a link may be released. For example, deselection for a keyword may occur when an input for deselecting the keyword is received on a suggest area and/or when an input of a text corresponding to a selected keyword is deleted in a message input window. As the selection is released, a display of the keyword may also be changed to a non-selected state. For example, as shown in FIG. 6A, when a deselection input for the keyword "Gangnam Station" is received in a state in which the keyword "Gangnam Station" is selected, the setting of information about a link set to "Gangnam Station" may be released. The deselection input for the keyword "Gangnam Station" may include an input for selecting an area 611 where the keyword "Gangnam Station" is displayed and/or an input for selecting a button 612 for selecting the keyword "Gangnam Station". When the deselection input for the keyword "Gangnam Station" is received, as shown in FIG. 6B, the keyword "Gangnam Station" may be changed to a display of a state in which the keyword "Gangnam Station" is not selected on a suggest area 620 and a message input window 630.

Figure 6C:
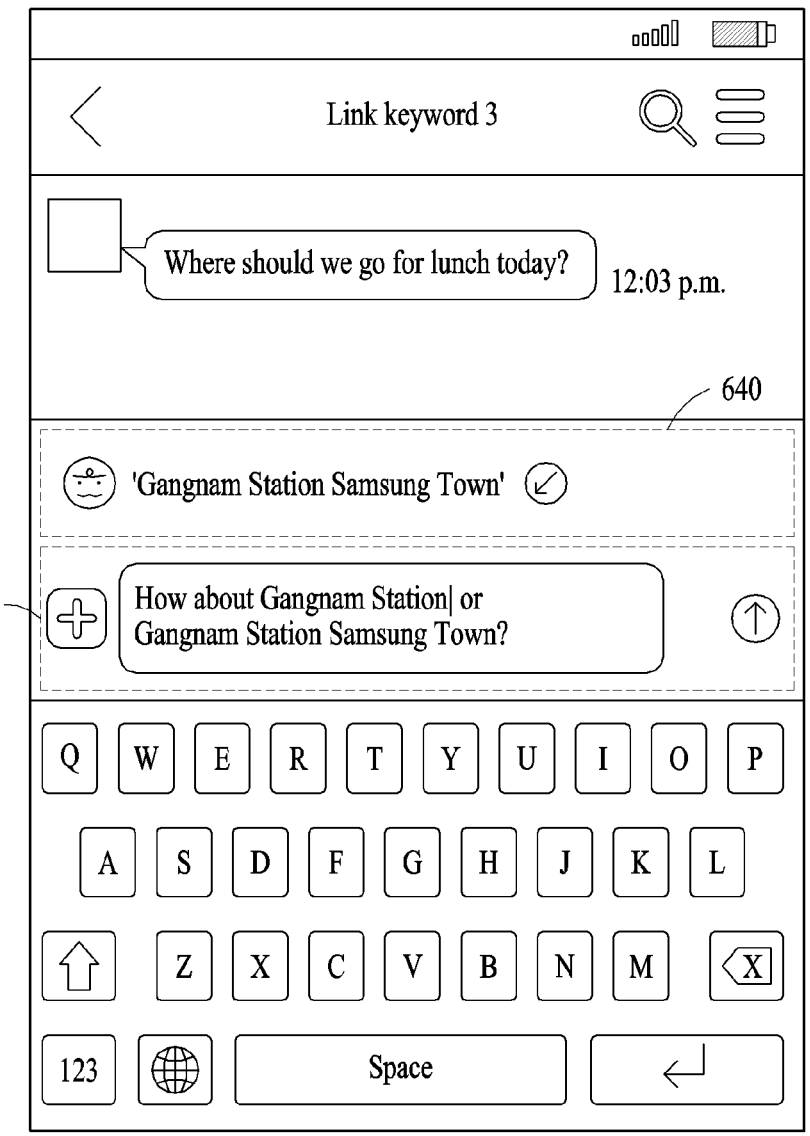

In another example, as shown in FIG. 6A, a message input window 610 in a state in which "How about Gangnam Station or Gangnam Station Samsung Town?" is input may be changed to the message input window 610 in a state in which "How about Gang or Gangnam Station Samsung Town?" is input as shown in FIG. 6C, by an input for deleting at least part of a text corresponding to a selected keyword. When at least a part ("nam Station") of the text corresponding to the keyword "Gangnam Station" is deleted, selection for the keyword "Gangnam Station" may be released. In addition, since "Gangnam Station" is no longer detected as a keyword in the text input in the message input window 650, the display for the keyword "Gangnam Station" on a suggest area 640 may be deleted and keyword information about "Gangnam Station" stored corresponding to the input text may also be deleted.

A method of operating a terminal according to an embodiment may further include sending a message including information about a link and a text in response to a message transmission request received from a user and separately displaying a word corresponding to a selected keyword in the message from different words in the message. A text (or a word) corresponding to the selected keyword in the message may be generated as hypertext based on the information about the link in a terminal of a receiver. That is, a text input in a message input window may be sent to a terminal of the user designated as receiving messages in response to the message transmission request. The message transmission may be performed through a server. The terminal receiving the message may generate a text corresponding to a selected keyword in the message received based on the information about the link set to the selected keyword as hypertext connected to an execution screen of various functions for the selected keyword or a page (e.g., a search result page or an app execution page). Hereinafter, the user who inputs a text through a chat interface may be referred to as a sender and a user who is designated as receiving messages may be referred to as a receiver. The sent message may be displayed in the chat interface.

Figure 7A:
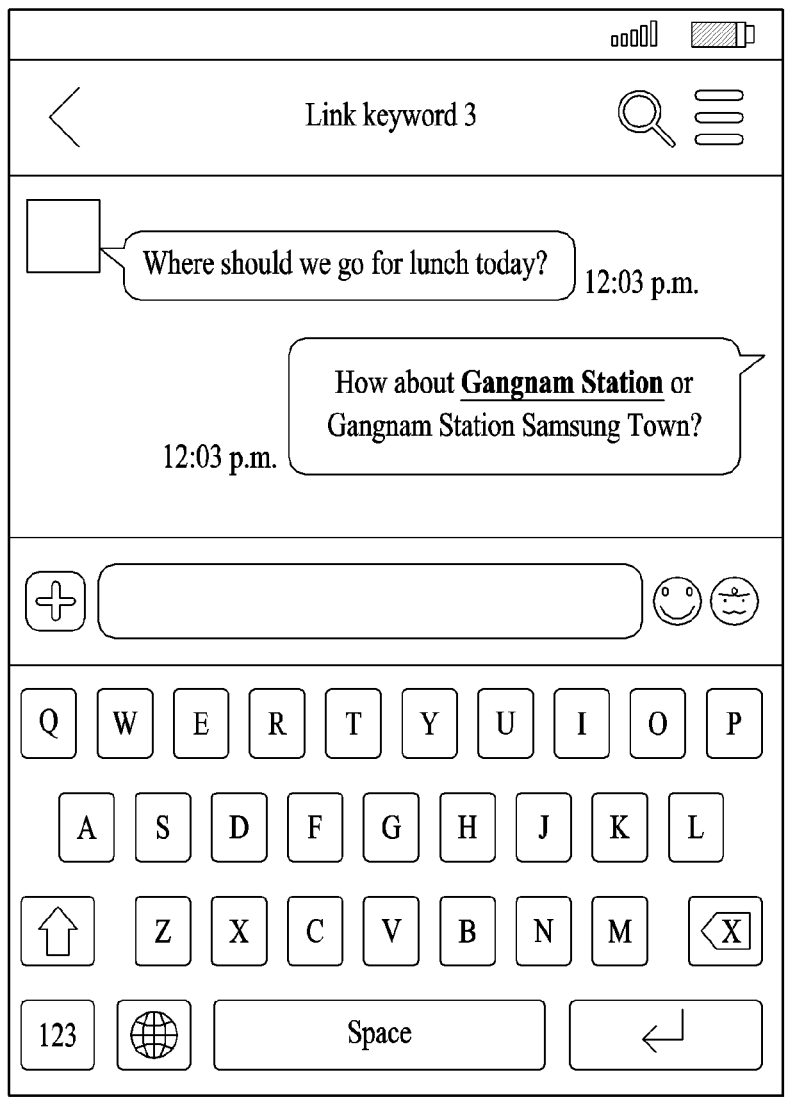
FIG. 7A is a diagram illustrating an example of a chat interface of a terminal of a sender in which a message is displayed according to an embodiment.

For example, FIG. 7A is a diagram illustrating an example of a chat interface of a terminal of a sender in which a message is displayed. Referring to FIG. 7A, a message including the keyword "Gangnam Station" to which a link is set may be displayed on the chat interface provided to the terminal of the sender. Sent messages may be displayed in the form of a conversation through a chat window. Accordingly, the terminal of the sender may receive a text input through the chat interface in the form of a message. The terminal of the sender may generate a text corresponding to a selected keyword in the message as hypertext based on information about a link in the message corresponding to the text input through a chat room. That is, the terminal of the sender may set a link to a search result page in a keyword for which the information about the link is set among texts in the message. A word generated as hypertext may be separately displayed from other words for which a link is not set. For example, unlike other words, the keyword "Gangnam Station" to which a link is set in the sent message may be underlined.

Figure 7B:
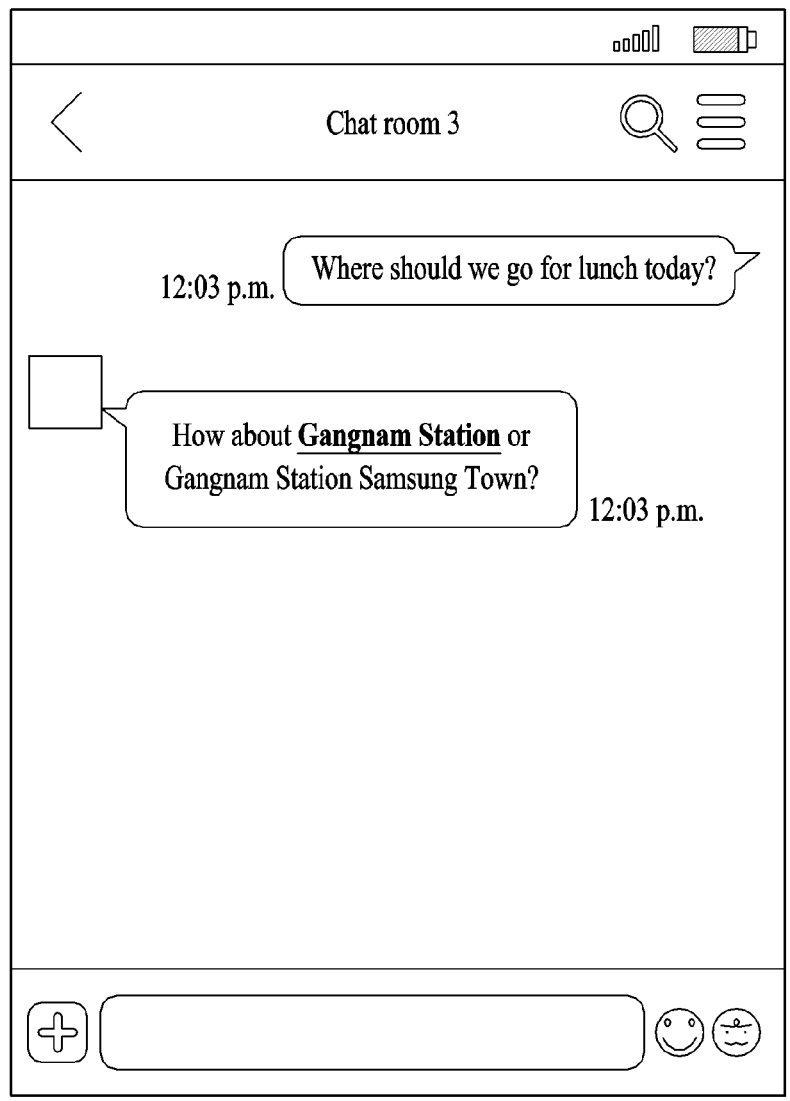
FIG. 7B is a diagram illustrating an example of a chat interface of a terminal of a receiver in which a message is displayed according to an embodiment.

For example, FIG. 7B is a diagram illustrating an example of a chat interface of a terminal of a receiver in which a message is displayed. Referring to FIG. 7B, like a terminal of a sender, a message including the keyword "Gangnam Station" to which a link is set may be displayed on the terminal of the receiver through the chat interface. The terminal of the receiver may generate a text corresponding to a selected keyword in a message as hypertext based on information about the link in a sent message. That is, the terminal of the receiver may set a link to a search result page in a keyword for which the information about the link is set among texts in the message. Unlike other words, the keyword "Gangnam Station" to which the link is set in the message displayed through the chat interface may be underlined.

Figure 7C:
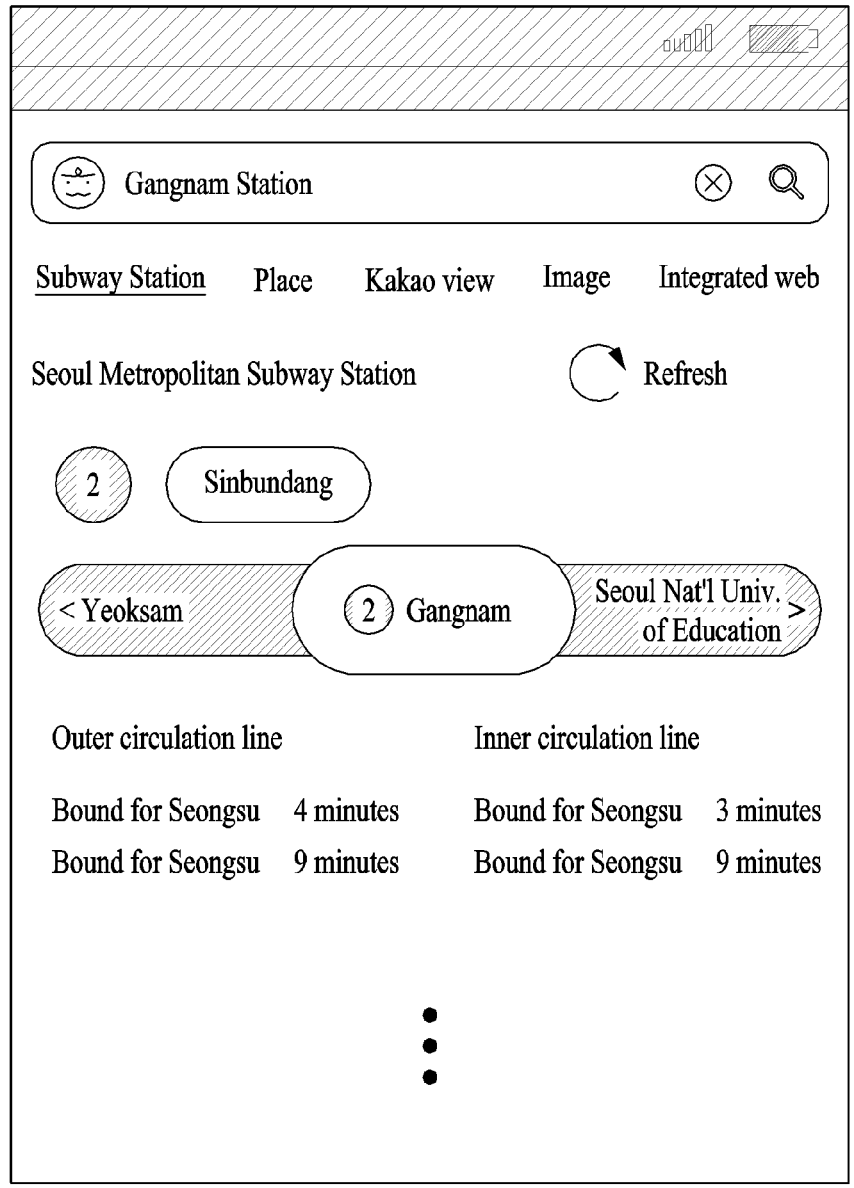
FIG. 7C is a diagram illustrating an example of a search result screen for a keyword connected to a message through a link according to an embodiment.

According to an embodiment, when an input for selecting a keyword for which a link is set in a message is received, a chat interface displaying a message may be connected to a search result screen regarding the corresponding keyword through the link. For example, referring to FIGS. 7A to 7C, when an input for selecting "Gangnam Station" to which the link in the message is set is received, the chat interfaces shown in FIG. 7A or 7B may be connected to a search result screen regarding "Gangnam Station" shown in FIG. 7C.

According to an embodiment, a search result screen connected through a link may be differently determined based on a driving environment of the search result screen. For example, when the search result screen is driven on a mobile terminal and when the search result screen is driven on a PC, the search result screen or a search result page connected through the link may be differently determined.

A method of operating a terminal according to an embodiment may further include determining information about a link in a message and a text in the message as a transfer target when a first type of transfer request for a sent message is received and determining the text in the message as a transfer target when a second type of transfer request for the sent message is received. That is, the terminal may determine the transfer target based on the type of the transfer request when the transfer request for the sent message is received.

According to an embodiment, the type of the transfer request may include a copy type and a shared type. The copy type may correspond to a message transfer type in which a text in a message is copied and stored in a clipboard and the text stored in the clipboard is pasted into a message input window. The shared type may correspond to a type in which a pre-sent message is transferred as it is to a terminal of a user who is a third party who does not correspond to a sender or a receiver of the corresponding message.

For example, when the type of the transfer request is a first type (e.g., the shared type), information about a link set in a keyword in addition to a text in a message may be determined as a transfer target. In another example, when the type of the transfer request is a second type (e.g., the copy type), the information about the link may be excluded from the transfer target and only the text in the message may be determined as the transfer target.

Figure 8:
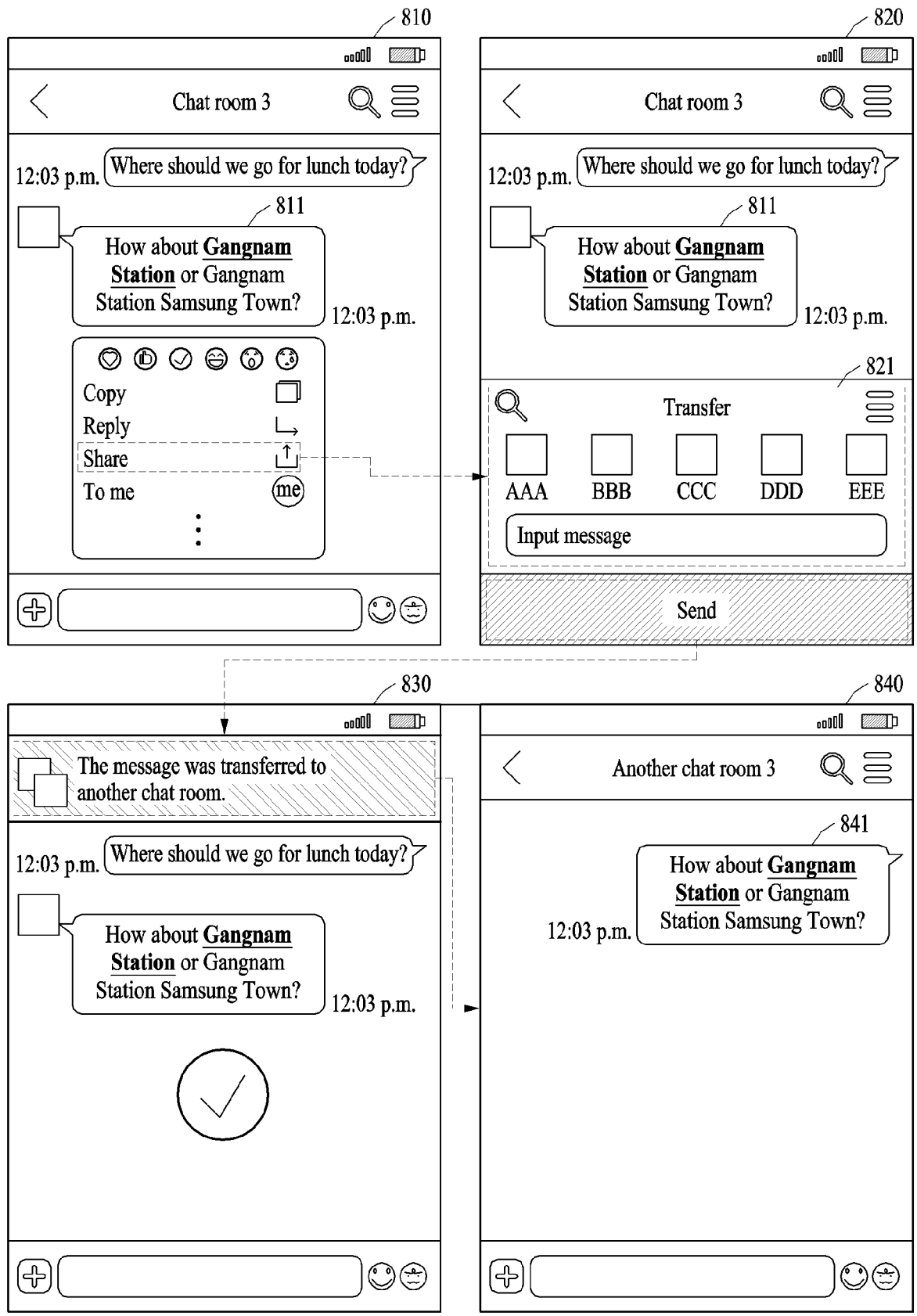
FIG. 8 is a diagram illustrating an example in which a message is transferred in a shared type according to an embodiment.

For example, referring to a chat interface 810 shown in FIG. 8, the first type of transfer request requesting sharing of a message 811 sent through chat room 1 may be input from a user. Based on the first type of transfer request, information about a link in a message and a text in the message may be determined as a transfer target. Referring to a chat interface 820, when the first type of transfer request is input, a list 821 of chat rooms for selecting a chat room to share the message may be provided. Referring to a chat interface 830, when a message transfer request is input to chat room 2 where the message is shared, the corresponding message may be transferred to the chat room 2. Referring to a chat interface 840 corresponding to the chat room 2, it may be confirmed that a message for which information about a link is set in the keyword "Gangnam Station" is sent. A terminal receiving the message shared through the chat room 2 may set a link to "Gangnam Station" in the message based on the information about the link set to the keyword "Gangnam Station" in the message. When a selection input for the keyword "Gangnam Station" to which a link is set in a message 841 transferred from the chat interface 840 corresponding to the chat room 2 is received, the chat interface 840 may be connected to a search result screen (e.g., FIG. 7C) having "Gangnam Station" as a search term by the set link.

Figure 9:
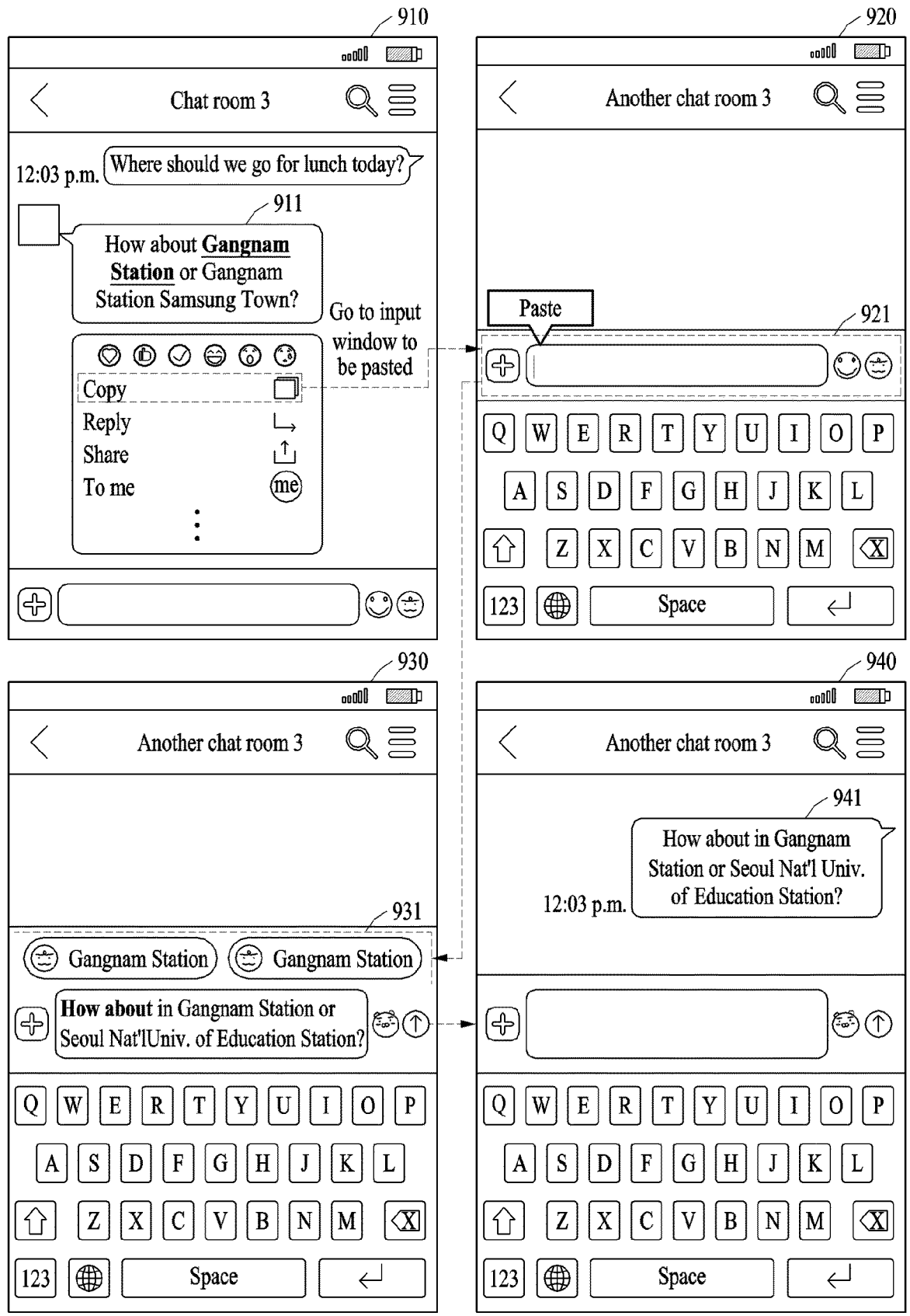
FIG. 9 is a diagram illustrating an example in which a message is transferred in a copy type according to an embodiment.

For example, referring to a chat interface 910 shown in FIG. 9, the second type of transfer request requesting copying of a message 911 sent through chat room 1 may be input from a user. Based on the second type of transfer request, a text in a message excluding information about a link may be determined as a transfer target. The user may paste a copied text into a message input window 921 by accessing a chat interface 920 corresponding to chat room 2 to which the message is to be transferred. When the copied message is pasted into the message input window 921, only text in the message is copied and the information about the set link may not be copied. The pasting of a copied message into the message input window 921 may operate in the same manner as inputting of a text in the copied message to the message input window 921. Referring to a chat interface 930, the copied text may be input to a message input window and the keyword "Gangnam Station" and the keyword "Seoul Nat'l Univ. of Education Station" may be detected from the input text. As the keyword is detected, a suggest area 931 may be activated and the keyword "Gangnam Station" and the keyword "Seoul Nat'l Univ. of Education Station" may be displayed on the suggest area 931. When a keyword selection input is received through the suggest area 931, information about a link may be set to a selected keyword. Referring to a chat interface 940 corresponding to the chat room 2, when a message transmission request for the copied text to a message input window is received, a message 941 corresponding to the copied text may be sent to the chat room 2.

Figure 10:
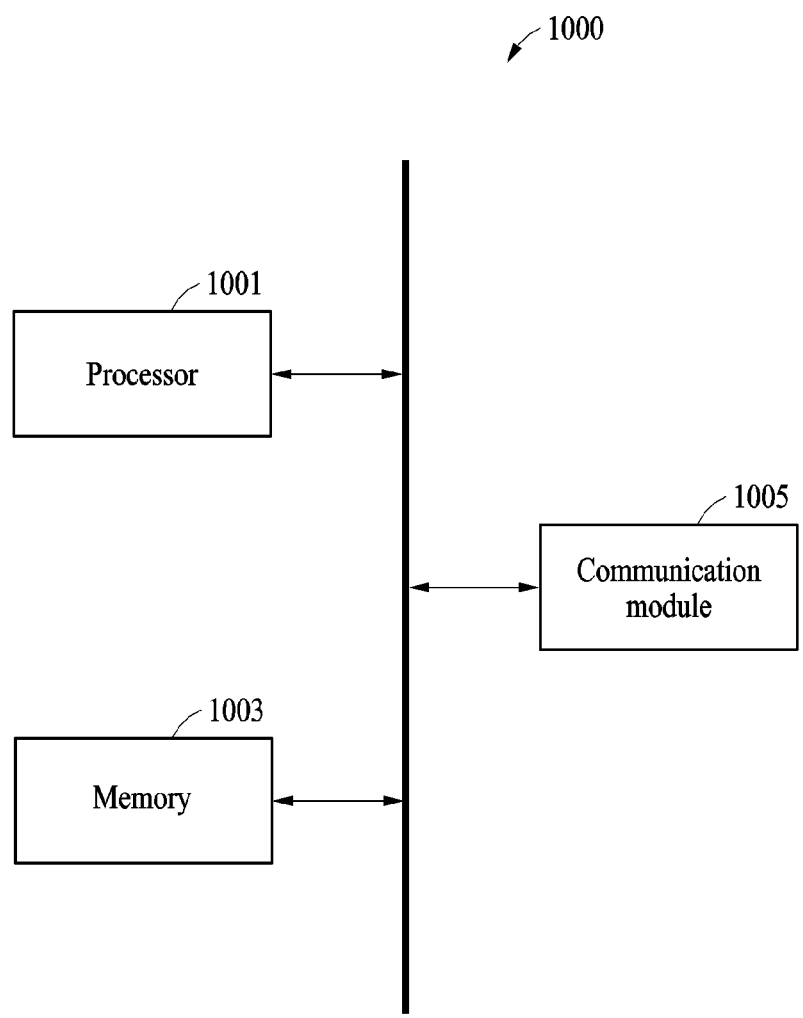
FIG. 10 is a diagram illustrating an example of a configuration of a terminal according to an embodiment.

FIG. 10 is a diagram illustrating an example of a configuration of a terminal according to an embodiment.

Referring to FIG. 10, a terminal 1000 may include a processor 1001, a memory 1003, and a communication module 1005. The terminal 1000 according to an embodiment may include the terminal on which the application for the messaging service described with reference to FIGS. 1 to 9 is installed.

The processor 1001 according to an embodiment may perform at least one operation described with reference to FIGS. 1 to 9. For example, the processor 1001 may perform at least one operation of detecting a keyword in a text input through a message input window, cumulatively displaying the detected keyword on a suggest area, setting information about a link to a selected keyword in the text and separately displaying the selected keyword from a non-selected keyword on the suggest area.

The memory 1003 according to an embodiment may be a volatile memory or non-volatile memory and may store data regarding a method of operating the terminal on which the application for the messaging service is installed described with reference to FIGS. 1 to 9. For example, the memory 1003 may store a keyword set and detected keyword information.

The communication module 1005 according to an embodiment may provide a function for the terminal 1000 to communicate with other electronic devices or other servers through a network. That is, the terminal 1000 may be connected to an external device (e.g., a terminal, server, or network) through the communication module 1005 to exchange data therewith. The terminal 1000 may send and receive data to and from a server providing a messaging service through the communication module 1005.

According to an embodiment, the memory 1003 may store a program in which the method of operating the terminal 1000 described with reference to FIGS. 1 to 9 is implemented. The processor 1001 may execute a program stored in the memory 1003 and control the terminal 1000.

Code of the program executed by the processor 1001 may be stored in the memory 1003. The terminal 1000 according to an embodiment may further include other components not shown in the drawing. For example, the terminal 1000 may further include an input/output interface including an input device and an output device as means for interfacing with the communication module 1005. In another example, the terminal 1000 may further include other components such as a transceiver, various sensors, and a database.

FIGS. 11A to 11D are diagrams illustrating an example of a search result screen for a keyword according to an embodiment.

According to an embodiment, when a keyword is detected in a text input to a chat interface, a preview of a search result screen related to the detected keyword may be provided. The search result screen may include a plurality of pages. The pages of the search result screen may be determined based on a keyword category.

Figure 11A:
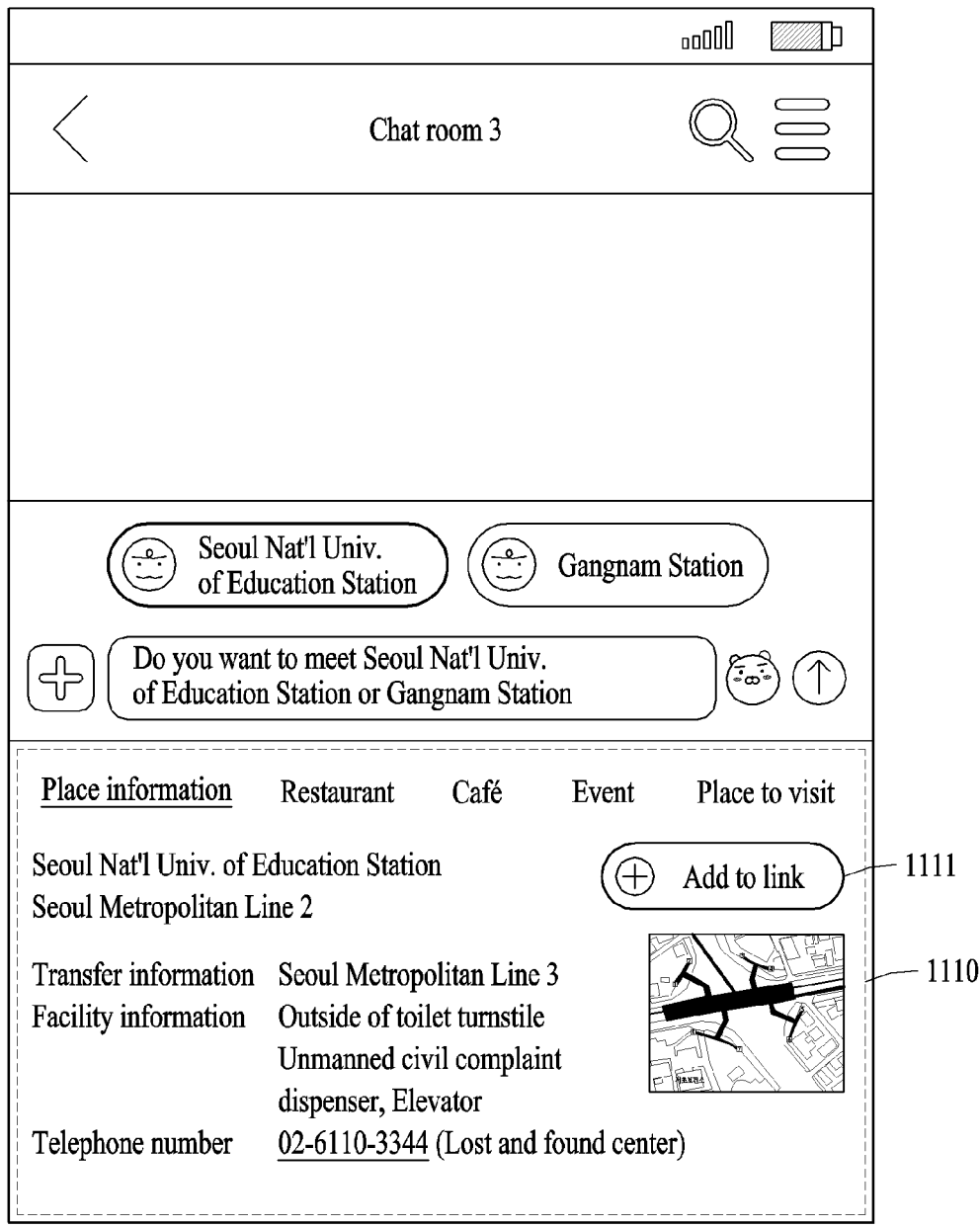
FIGS. 11A to 11D are diagrams illustrating an example of a search result screen for a keyword according to an embodiment.

Referring to FIG. 11A, a chat interface according to an embodiment may include a preview area 1110 for providing a preview of the plurality of pages in the search result screen. For example, in the case of keywords for place name categories, such as "Seoul Nat'l Univ. of Education Station" and "Gangnam Station", the search result screen may include the plurality of pages that may be provided related to the corresponding place such as "place information", "restaurant", "cafe", "event", and "place to visit". For example, the search result screen for the first detected keyword in the input text may be displayed on the preview area 1110.

Figure 11B:
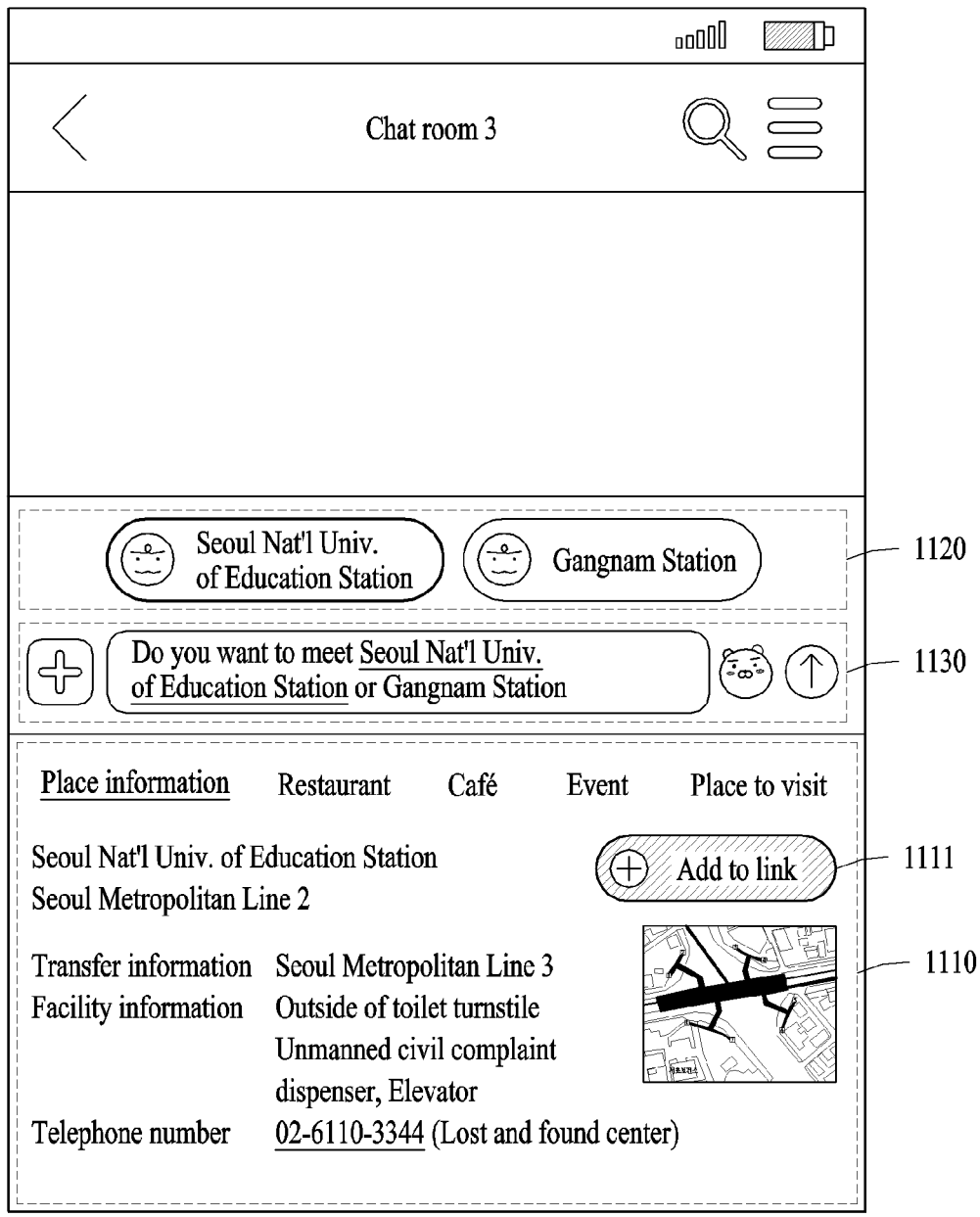
Figure 11C:
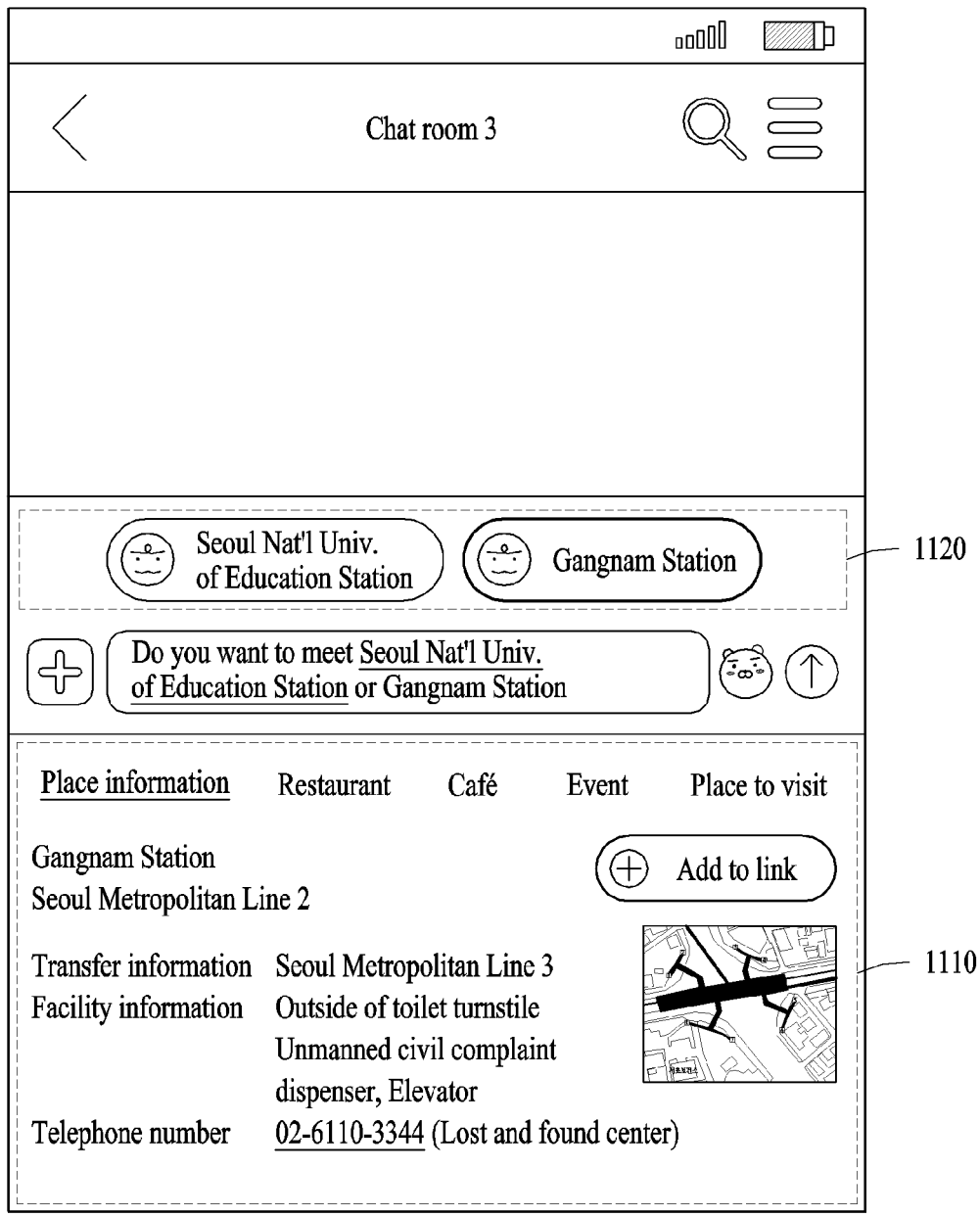

Referring to FIG. 11B, a keyword selection input on a suggest area 1120 according to an embodiment may correspond to an input for activating a preview of a search result screen related to a corresponding keyword on the preview area 1110. For example, when the keyword "Seoul Nat'l Univ. of Education Station" is selected on the suggest area 1120, a preview of a search result screen related to "Seoul Nat'l Univ. of Education Station" may be displayed on the preview area 1110. Furthermore, referring to FIG. 11C, when the keyword "Gangnam Station" is selected on the suggest area 1120, a preview of a search result screen related to "Gangnam Station" may be displayed on the preview area 1110.

According to an embodiment, a user may select at least one page from among the plurality of pages through the preview area 1110. For example, a page selected by the user may be determined as a page to be connected through a link.

For example, referring to FIG. 11A, through an input for selecting a button 1111 in a "place information" page of the search result screen, a user may select the corresponding page as a page to be provided as a search result screen for the keyword "Seoul Nat'l Univ. of Education Station". When the selection input of the button 1111 in the "place information" page of the search result screen corresponding to the keyword "Seoul Nat'l Univ. of Education Station" is received, the terminal may set information about a link to be connected to the "place information" page in the keyword "Seoul Nat'l Univ. of Education Station". Referring to FIG. 11B, when the information about the link of the "place information" page is set in the keyword "Seoul Nat'l Univ. of Education Station", a display of the button 1111 of the "place information" page may be changed to indicate that the information about the link of the corresponding page is set on the preview area 1110. To indicate that "Seoul Nat'l Univ. of Education Station" is a keyword for which the information about the link is set, a display of "Seoul Nat'l Univ. of Education Station" in a message input window 1130 may be changed.

Figure 11D:
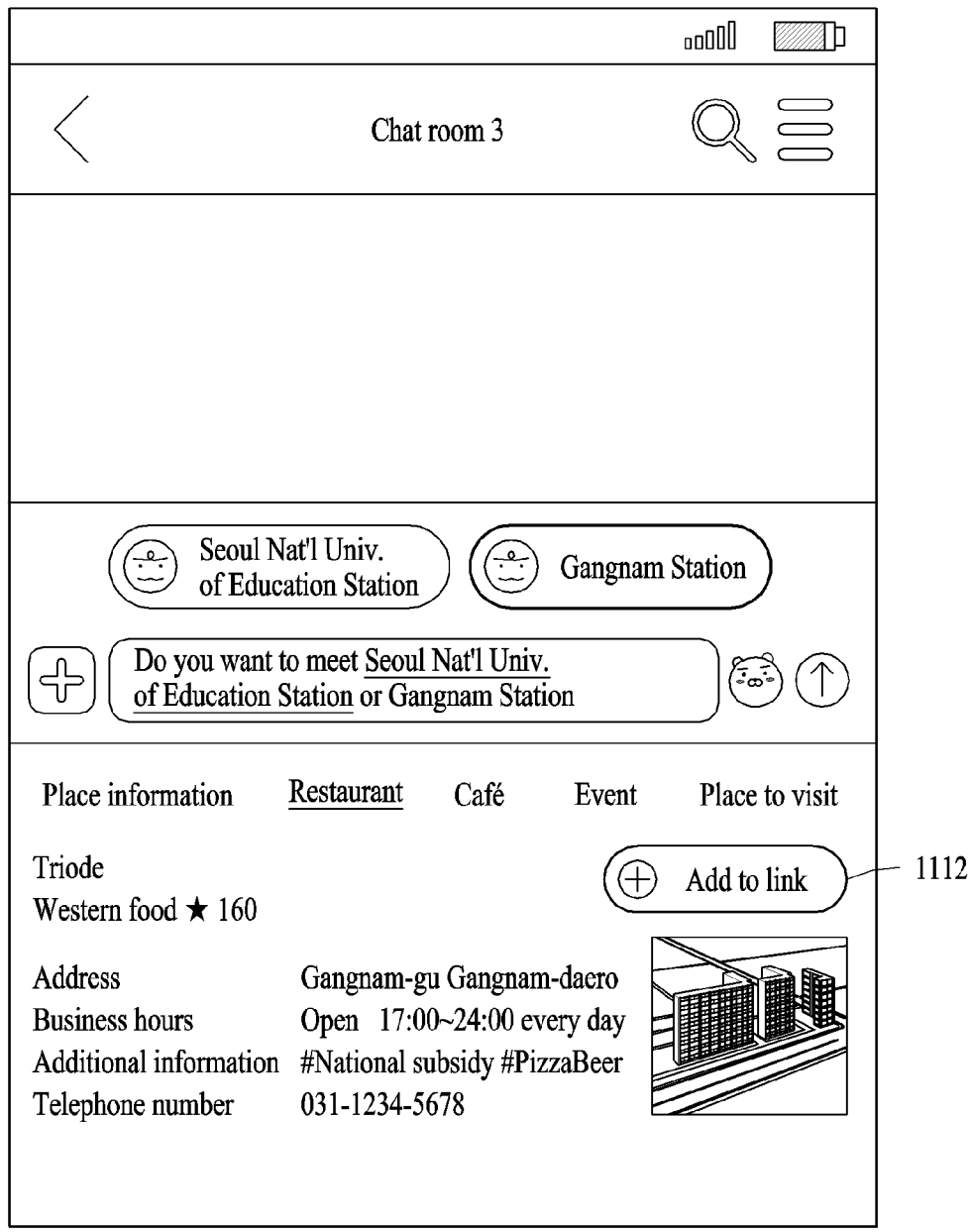

In another example, referring to FIG. 11D, through an input for selecting a button 1112 in a "restaurant" page of a search result screen corresponding to the keyword "Gangnam Station", a user may select the corresponding page as a page to be provided as a search result screen for the keyword "Gangnam Station". When a selection input of the button 1112 in the "restaurant" page of the search result screen corresponding to the keyword "Gangnam Station" is received, a terminal may set information about a link to be connected to the "restaurant" page in the keyword "Gangnam Station".

In another example, it may be determined that a page selected by the user from among the plurality of pages is displayed first. The order of the plurality of pages may be determined by an input of the user. When there is no user input regarding order determination, the plurality of pages may be provided according to a predetermined order corresponding to a keyword category.

The pages in the search result screens shown in FIGS. 11A to 11D correspond to an example, and the pages of the search result screens are not limited. The pages on the search result screens may include pages implemented in various ways related to a keyword such as a page including a variety of information that may be obtained by searching for a corresponding keyword in a web browser according to a keyword category, a page including an advertisement related to the keyword, and a page for inducing purchase conversion of products related to the keyword.

Figure 12:
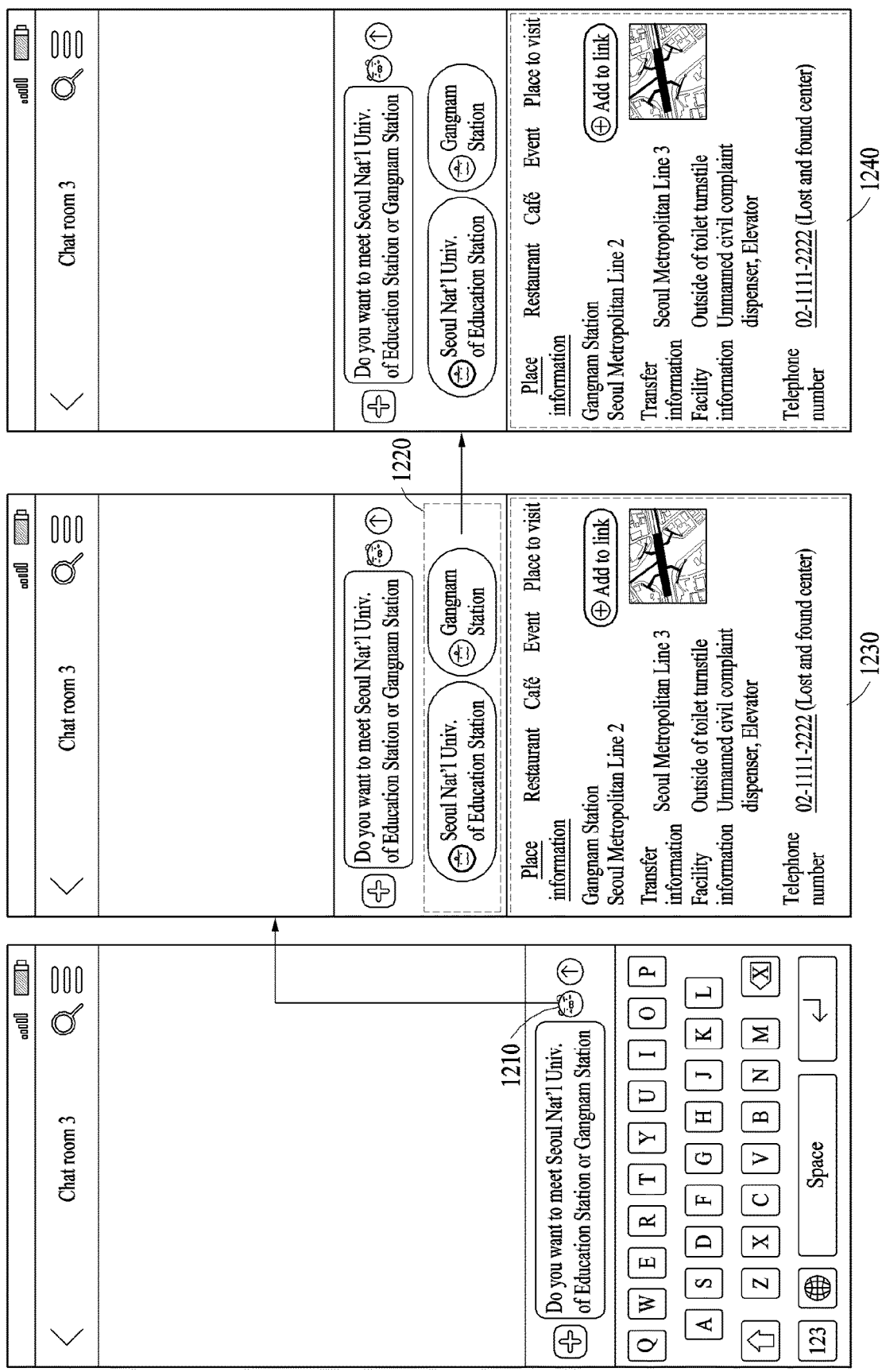
FIG. 12 is a diagram illustrating various display methods of a suggest area and a preview area according to an embodiment.

FIG. 12 is a diagram illustrating various display methods of a suggest area and a preview area according to an embodiment.

According to an embodiment, a suggest area 1220 in which a keyword detected from a text input in a message input window is displayed and/or a preview area 1230 that provides a preview of a search result screen for the keyword may be activated when an input requesting a link setting of a user is received.

For example, referring to FIG. 12, a chat interface may include a button 1210 for requesting a link setting. When selection of the button 1210 for requesting a link setting is input from a user, displays of the suggest area 1220 and/or the preview area 1230 may be activated.

According to an embodiment, when a link setting request is received from a user, displays of the suggest area 1220 and/or the preview area 1230 may be activated so that the limited space of a chat interface to provide various information may be efficiently used.

According to an embodiment, a keyword selection input may be received on the suggest area 1220 activated as described above, and when "Seoul Nat'l Univ. of Education Station" is selected on the suggest area 1220, the preview area 1230 displaying a search result screen corresponding to "Seoul Nat'l Univ. of Education Station" may be provided. When "Gangnam Station" is selected on the suggest area 1220, a preview area 1240 displaying a search result screen corresponding to "Gangnam Station" may be provided.

The examples described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. A method of operating a terminal on which an application for a messaging service is installed, the method comprising:

detecting keywords from different areas of a text input through a message input window in a chat interface;

cumulatively displaying the detected keywords on a suggest area in the chat interface including widgets for each respective detected keywords that can be toggled, upon user selection, between a first state and a second state, wherein, when a respective widget is in the first state, the respective detected keyword in the message input window is replaced with hypertext and, when the respective widget is in the second state, the hypertext for the respective detected keyword in the message input window is replaced with ordinary text;

setting information about a link to a selected keyword in the text input in response to a keyword selection input comprising a toggle of a respective widget for the selected keyword received through the suggest area; and separately displaying a widget corresponding to the selected keyword from a widget corresponding to a non-selected keyword on the suggest area.

2. The method of claim 1, further comprising:
separately displaying a keyword for which the information about the link is set from other words in the text input to the message input window in response to the keyword selection input received through the suggest area.

3. The method of claim 1, further comprising:
sending a message comprising the information about the link and the text input in response to a message transmission request received from a user of the terminal; and
separately displaying a word corresponding to the selected keyword in the message from other words in the message.

4. The method of claim 3, further comprising:
determining the information about the link and the text input as a transfer target when a first type of transfer request for the sent message is received; and
determining the text input as a transfer target when a second type of transfer request for the sent message is received.

5. The method of claim 1, further comprising:
detecting a message input of a user through the message input window; and
activating a display of the suggest area based on a detection of the message input and the detected keywords.

6. The method of claim 1, further comprising:
storing the detected keywords and a position of the detected keywords in the text input.

7. The method of claim 1, wherein the detecting of the keywords comprises detecting at least one keyword in at least a part of the text input based on a position of a cursor in the message input window.

8. The method of claim 1, wherein the detecting of the keywords comprises detecting the keywords based on a spacing unit of the text input.

9. The method of claim 1, wherein the cumulatively displaying of the detected keywords comprises cumulatively displaying the detected keywords based on whether the detected keywords overlap with a respective pre-stored keyword corresponding the text input.

10. The method of claim 1, wherein the suggest area is displayed adjacent to the message input window.

11. A non-transitory computer-readable storage medium storing instructions that, when executed by a processor, cause the processor to perform the method of claim 1.

12. A terminal on which an application for a messaging service is installed, the terminal comprising:
at least one processor configured to:
detect keywords from different areas of a text input through a message input window in a chat interface;
cumulatively display the detected keywords on a suggest area in the chat interface including widgets for each respective detected keywords that can be toggled, upon user selection, between a first state and a second state, wherein, when a respective widget is in the first state, the respective detected keyword in the message input window is replaced with hypertext and, when the respective widget is in the second state, the hypertext for the respective detected keyword in the message input window is replaced with ordinary text;
set information about a link to a selected keyword in the text input in response to a keyword selection input comprising a toggle of a respective widget for the selected keyword received through the suggest area; and
separately display a widget corresponding to the selected keyword from a widget corresponding to a non-selected keyword on the suggest area.

13. The terminal of claim 12, wherein the at least one processor is configured to separately display a keyword for which the information about the link is set from other words in the text input through the message input window in response to the keyword selection input received through the suggest area.

14. The terminal of claim 12, wherein the at least one processor is configured to:
send a message comprising the information about the link and the text input in response to a message transmission request received from a user of the terminal; and
separately display a word corresponding to the selected keyword in the message from other words in the message.

15. The terminal of claim 14, wherein the at least one processor is configured to:
determine the information about the link and the text input as a transfer target when a first type of transfer request for the sent message is received; and
determine the text input as a transfer target when a second type of transfer request for the sent message is received.

16. The terminal of claim 12, wherein the at least one processor is configured to:
detect a message input of a user through the message input window; and
activate a display of the suggest area based on a detection of the message input and the detected keywords.

17. The terminal of claim 12, wherein the at least one processor is configured to store the detected keywords and a position of the detected keywords in the text input.

18. The terminal of claim 12, wherein the at least one processor is configured to detect at least one keyword in at least a part of the text input based on a position of a cursor in the message input window in the detecting of the at least one keyword.

19. The terminal of claim 12, wherein the at least one processor is configured to detect the keywords based on a spacing unit of the text input in the detecting of the keywords.

20. The terminal of claim 12, wherein the at least one processor is configured to cumulatively display the detected keywords based on whether the detected keywords overlap with a respective pre-stored keyword corresponding to the text input in the cumulatively displaying of the detected keywords.

* * * * *